US012641586B2

(12) United States Patent
Shen et al.

(10) Patent No.: US 12,641,586 B2
(45) Date of Patent: May 26, 2026

(54) METHOD SYSTEM FOR IMPROVING SIGNAL QUALITY AND REDUCING POWER CONSUMPTION

(71) Applicant: SAMSUNG ELECTRONICS CO., LTD., Suwon-si (KR)

(72) Inventors: Songhui Shen, Beijing (CN); He Wang, Beijing (CN); Liying Zhou, Beijing (CN); Yiyan Zhang, Beijing (CN); Lei Wang, Beijing (CN); Chaeman Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 431 days.

(21) Appl. No.: 18/316,627

(22) Filed: May 12, 2023

(65) Prior Publication Data

US 2024/0057058 A1 Feb. 15, 2024

Related U.S. Application Data

(63) Continuation of application No. PCT/KR2023/005831, filed on Apr. 27, 2023.

(30) Foreign Application Priority Data

Aug. 10, 2022 (CN) .......................... 202210959154.8

(51) Int. Cl.
*H04W 72/044* (2023.01)

(52) U.S. Cl.
CPC ................................. *H04W 72/046* (2013.01)

(58) Field of Classification Search
CPC .. H04W 72/046; H04W 16/28; H04B 7/0695; H04B 7/088; H04B 7/06952; H04B 7/06958; H04B 7/0628; H04B 7/0626
See application file for complete search history.

(56) References Cited

U.S. PATENT DOCUMENTS 11,304,063 B2 4/2022 Moon et al.
11,381,296 B2 7/2022 Islam et al.
(Continued)

FOREIGN PATENT DOCUMENTS

CN        111132183        5/2020
KR     20220040988 A      3/2022
(Continued)

OTHER PUBLICATIONS

Samsung, "Evaluation on AI/ML for beam management", 3GPP TSG RAN WG1 #109-e, R1-2203899, e-meeting, May 9-May 20, 2022, 24 pages.

(Continued)

*Primary Examiner* — Mewale A Ambaye
(74) *Attorney, Agent, or Firm* — Nixon & Vanderhye, P.C.

(57) ABSTRACT

A method performed by a base station, includes transmitting a reference signal associated with a first beam in a beambook to a user equipment (UE), wherein the beambook comprises a first beam set including the first beam and a second beam set; determining a transmitting beam of the first beam set and the second beam set based on measurement information including received power value of the reference signal received from the UE; determining an index of the first beam corresponding to the transmitting beam in case that the transmitting beam is a second beam included in the second beam set; and transmitting beam information including the index to the UE. The first beam is configured to measure the received power value. A signal transmitted using the first beam and a signal transmitted using the second beam are received using a receiving beam of the UE.

20 Claims, 29 Drawing Sheets

S410 — transmitting measurement reference signal configured for first beam in beambook set to user equipment (UE), wherein the beambook set includes at least one first beam and at least one second beam S420 — determining transmitting beam from the beambook set based on reference signal measurement reported by the UE S430 — determining first beam corresponding to the transmitting beam if the transmitting beam is the second beam, and transmitting beam information of the determined first beam to the UE S440 — transmitting data to the UE using the determined transmitting beam

(56)             References Cited

U.S. PATENT DOCUMENTS

| | | | |
|---|---|---|---|
| 11,395,155 | B2 | 7/2022 | Zhu et al. |
| 11,563,502 | B2 | 1/2023 | Shen et al. |
| 2019/0081753 | A1* | 3/2019 | Jung .................... H04B 7/0695 |
| 2020/0014454 | A1* | 1/2020 | Guo ...................... H04B 7/088 |
| 2021/0058131 | A1* | 2/2021 | Zhu ..................... H04B 7/0478 |
| 2021/0068123 | A1 | 3/2021 | Zhu |
| 2021/0359747 | A1* | 11/2021 | Islam ................ H04B 7/06958 |
| 2023/0054878 | A1* | 2/2023 | Xu ........................ H04L 5/0048 |
| 2023/0164547 | A1* | 5/2023 | Dai ...................... H04W 12/03 |
| | | | 713/150 |
| 2023/0180205 | A1* | 6/2023 | Xu .................... H04B 7/06964 |
| | | | 370/329 |
| 2023/0319918 | A1* | 10/2023 | Dutta ................. H04W 72/046 |
| | | | 370/329 |

FOREIGN PATENT DOCUMENTS

| | | | |
|---|---|---|---|
| WO | 2020212739 | A1 | 10/2020 |
| WO | 2021/252727 | A1 | 12/2021 |
| WO | 2022069054 | A1 | 4/2022 |

OTHER PUBLICATIONS

International Search Report dated Jul. 26, 2023 in PCT/KR2023/005831.
Written Opinion dated Jul. 26, 2023 in PCT/KR2023/005831.

* cited by examiner

116

305

310

330                325

SPEAKER ← RX PROCESSING CIRCUIT ←   RF TRANSCEIVER 320                315

MICROPHONE → TX PROCESSING CIRCUIT 345                340                350

I/O IF ↔ PROCESSOR/ CONTROLLER ← INPUT

DISPLAY

355

360

MEMORY

361 — OPERATING SYSTEM

362 — APPLICATION

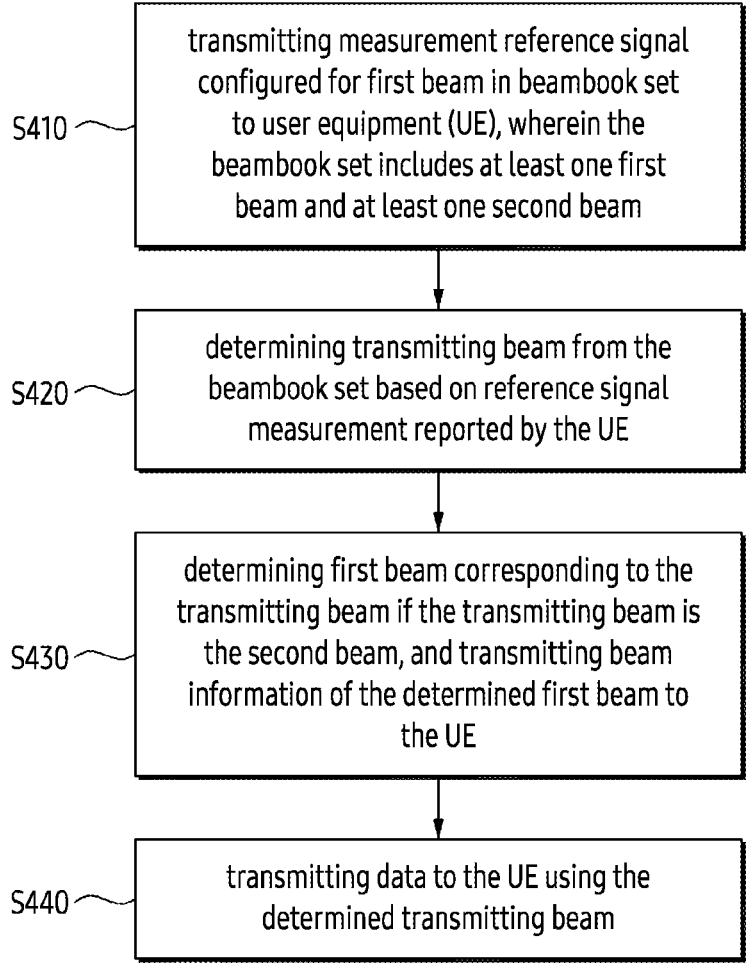

S410 — transmitting measurement reference signal configured for first beam in beambook set to user equipment (UE), wherein the beambook set includes at least one first beam and at least one second beam S420 — determining transmitting beam from the beambook set based on reference signal measurement reported by the UE S430 — determining first beam corresponding to the transmitting beam if the transmitting beam is the second beam, and transmitting beam information of the determined first beam to the UE S440 — transmitting data to the UE using the determined transmitting beam

FIG. 4 uniform beam direction design non-uniform beam direction design enlarged virtual beambook type uniform beam direction design N — SSB based regular beam V — enlarged virtual beam non-uniform beam direction design N — SSB based regular beam V — enlarged virtual beam beam direction design
focused on cell-edge UEs (N) SSB based
regular beam (V) enlarged
virtual beam

1121 time step #i-(T-1)

time step #i-(T-2)

time step #i-1 time step #i

1123

| | beam#0 | beam#1 | beam#2 | beam#3 | beam#4 | beam#5 | beam#6 | ... | beam#N-2 | beam#N-1 |
|---|---|---|---|---|---|---|---|---|---|---|
| time step#i-(T-1) | RSRP_0 | RSRP_1 | default value | default value | RSRP_4 | RSRP_5 | default value | | default value | default value |
| time step#i-(T-2) | default value | RSRP_1 | RSRP_2 | default value | default value | RSRP_5 | RSRP_6 | | default value | default value |
| ... | ... | | | | | | | | | |
| time step#i-1 | ... | | | | | | | | | |
| time step#i | ... | | | | | | | | | |

FIG. 11B

| predicted beam sequence number | predicted beam sequence number |
|:---:|:---:|
| 0 | 0 |
| 1 | 1 |
| 2 | 2 |
| ... | ... |
| 62 | 62 |
| 63 | 63 |
| 64 | 0 |
| 65 | 1 |
| 66 | 2 |
| ... | ... |
| 126 | 62 |
| 127 | 63 | regular beam { virtual beam {

FIG. 12A

| predicted beam sequence number | indication beam sequence number |
|---|---|
| 0 | 0 |
| 1 | 0 |
| 2 | 2 |
| 3 | 2 |
| ... | ... |
| 62 | 62 |
| 63 | 62 | regular beam virtual beam

FIG. 12B

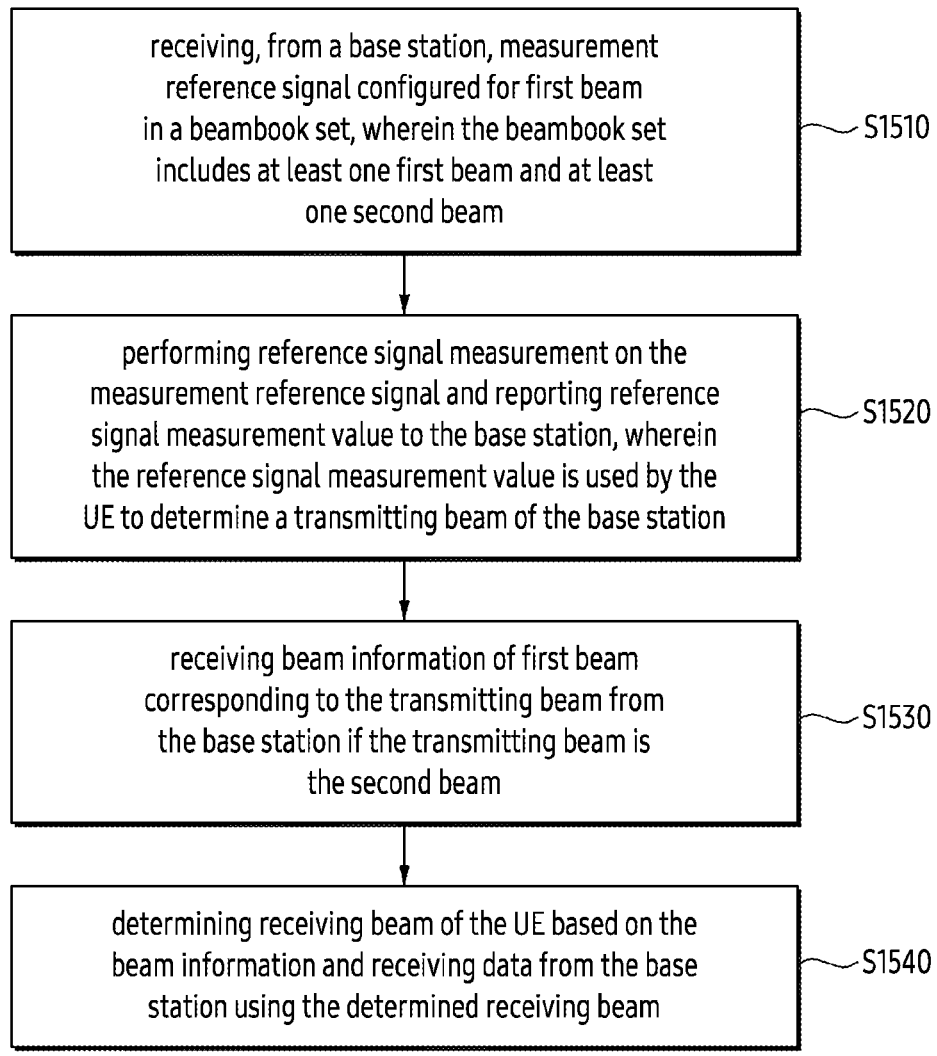

receiving, from a base station, measurement
reference signal configured for first beam
in a beambook set, wherein the beambook set
includes at least one first beam and at least
one second beam — S1510 performing reference signal measurement on the
measurement reference signal and reporting reference
signal measurement value to the base station, wherein
the reference signal measurement value is used by the
UE to determine a transmitting beam of the base station — S1520 receiving beam information of first beam
corresponding to the transmitting beam from
the base station if the transmitting beam is
the second beam — S1530 determining receiving beam of the UE based on the
beam information and receiving data from the base
station using the determined receiving beam — S1540

1910 memory

1920 processor

METHOD SYSTEM FOR IMPROVING SIGNAL QUALITY AND REDUCING POWER CONSUMPTION

CROSS-REFERENCE TO RELATED APPLICATIONS

This application is a continuation of International Application No. PCT/KR2023/005831 designating the United States, filed Apr. 27, 2023, and claiming priority to Chinese Patent Application No. 202210959154.8 filed on Aug. 10, 2022, in the China National Intellectual Property Administration. The entire disclosures of each of these applications are incorporated herein by reference for all purposes.

BACKGROUND

Field

The disclosure relates to the field of wireless communication, and for example, to a base station and a wireless communication method thereof, a user equipment and a wireless communication method thereof, an electronic device and a storage medium.

Description of Related Art

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 30 Hz or 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, advanced coding modulation (ACM), such as hybrid FSK and QAM modulation (FQAM) and sliding window superposition coding (SWSC), and advanced access technologies, such as filter bank multicarrier (FBMC), non-orthogonal multiple access (NOMA) and sparse code multiple access (SCMA), have been developed.

SUMMARY

According to an example embodiments, a wireless communication method for a base station may include transmitting a measurement reference signal configured for a first beam in a beambook set to a user equipment (UE), wherein the beambook set includes at least one first beam and at least one second beam; determining a transmitting beam from the beambook set based on a reference signal measurement value reported by the UE; determining a first beam corresponding to the transmitting beam if the transmitting beam is the second beam, and transmitting beam information of the determined first beam to the UE; transmitting data to the UE using the determined transmitting beam.

According to an example embodiment, the first beam may be a beam that needs to be configured with the measurement reference signal, and the second beam may be a beam that does not need to be configured with the measurement reference signal.

According to an example embodiment, the method may further include selecting the beambook set from a plurality of beambook sets, wherein the plurality of beambook sets include at least two of a first beambook set of a first beambook type, a second beambook set of a second beambook type, or a third beambook set of a third beambook type, wherein all beams in the first beambook set are first beams; the number of beams in the second beambook set is greater than the number of beams in the first beambook set, and some of the beams in the second beambook set are first beams, and some other ones of the beams are second beams; the number of beams in the third beambook set is equal to or smaller than the number of the beams in the first beambook set, and some of the beams in the third beambook set are first beams and some other ones of the beams are second beams.

According to an example embodiment, the selecting of the beambook set from the plurality of beambook sets includes selecting the beambook set from the plurality of beambook sets based on at least one of cell load of a cell where the base station is located, a distribution of UEs in the cell, or a maximum transmitting power of the base station.

According to an example embodiment, the selecting of the beambook set from the plurality of beambook sets includes selecting the second beambook set from the plurality of beambook sets as the beambook set if a first condition is satisfied, wherein the first condition is that the cell load is greater than a first threshold and the number of UEs located at the edge of the cell is greater than a second threshold; and/or selecting the third beambook set from the plurality of beambook sets as the beambook set if a second condition is satisfied, wherein the second condition is that the cell load is less than a third threshold.

According to an example embodiment, the selecting of the beambook set from the plurality of beambook sets includes at least one of selecting the second beambook set from the plurality of beambook sets as the beambook set if the maximum transmitting power of the base station is not less than a first preset threshold and selecting the third beambook set from the plurality of beambook sets as the beambook set if the maximum transmitting power of the base station is not greater than a second preset threshold.

According to an example embodiment, the wireless communication method may further include configuring the measurement reference signal for each first beam in the beambook set, wherein the measurement reference signal includes a synchronization signal block (SSB) reference signal.

According to an example embodiment, the determining of the transmitting beam from the beambook set based on the reference signal measurement value reported by the UE may include determining the transmitting beam from the beambook set using a prediction model, based on the reference signal measurement value reported by the UE and a historical reference signal measurement value historically reported by the UE.

According to an example embodiment, the wireless communication method may further include transmitting the beam information of the transmitting beam to the UE if the transmitting beam is the first beam.

According to an example embodiment, the determining of the first beam corresponding to the transmitting beam may include determining the first beam corresponding to the transmitting beam based on a mapping relationship between the first beam and the second beam.

According to an example embodiment, the mapping relationship between the first beam and the second beam may be established according to spatial correlation between the second beam and the first beam.

According to an example embodiment, the determined first beam and the transmitting beam may have similar spatial beam directions.

According to an example embodiment, the transmitting of the beam information of the determined first beam to the UE may include transmitting the beam information of the determined first beam to the UE based on a transmission configuration indication (TCI) state corresponding to the measurement reference signal.

According to an example embodiment, a wireless communication method for a user equipment may include receiving, from a base station, a measurement reference signal configured for a first beam in a beambook set, wherein the beambook set includes at least one first beam and at least one second beam; performing reference signal measurement on the measurement reference signal, and reporting a reference signal measurement value to the base station, wherein the reference signal measurement value is used by the UE to determine a transmitting beam of the base station; receiving beam information of a first beam corresponding to the transmitting beam from the base station if the transmitting beam is the second beam; determining a receiving beam of the UE based on the beam information, and receiving data from the base station using the determined receiving beam.

According to an example embodiment, the wireless communication method may further include receiving the beam information of the transmitting beam from the base station if the transmitting beam is the first beam.

According to an example embodiment, the first beam may be a beam that needs to be configured with the measurement reference signal, and the second beam may be a beam that does not need to be configured with the measurement reference signal.

According to an example embodiment, a base station may include a communication unit and at least one processor connected to the communication unit and configured to control the communication unit to transmit a measurement reference signal configured for a first beam in a beambook set to a user equipment (UE), wherein the beambook set includes at least one first beam and at least one second beam; determine a transmitting beam from the beambook set based on a reference signal measurement value reported by the UE; determine a first beam corresponding to the transmitting beam if the transmitting beam is the second beam, and control the communication unit to transmit beam information of the determined first beam to the UE; and control the communication unit to transmit data to the UE using the determined transmitting beam.

According to an example embodiment, the first beam may be a beam that needs to be configured with the measurement reference signal, and the second beam may be a beam that does not need to be configured with the measurement reference signal.

According to an example embodiment, the at least one processor may be configured to select the beambook set from a plurality of beambook sets, wherein the plurality of beambook sets include at least two of a first beambook set of a first beambook type, a second beambook set of a second beambook type, or a third beambook set of a third beambook type, wherein all beams in the first beambook set are first beams; the number of beams in the second beambook set is greater than the number of beams in the first beambook set, and some of the beams in the second beambook set are first beams, and some other ones of the beams are second beams; the number of beams in the third beambook set is equal to or smaller than the number of the beams in the first beambook set, and some of the beams in the third beambook set are first beams and some other ones of the beams are second beams.

According to an embodiment, the selecting of the beambook set from the plurality of beambook sets may include selecting the beambook set from the plurality of beambook sets based on at least one of cell load of a cell where the base station is located, a distribution of UEs in the cell, or a maximum transmitting power of the base station.

According to an embodiment, the selecting of the beambook set from the plurality of beambook sets may include selecting the second beambook set from the plurality of beambook sets as the beambook set if a first condition is satisfied, wherein the first condition is that the cell load is greater than a first threshold and the number of UEs located at the edge of the cell is greater than a second threshold and/or selecting the third beambook set from the plurality of beambook sets as the beambook set if a second condition is satisfied, wherein the second condition is that the cell load is less than a third threshold.

According to an embodiment, the selecting of the beambook set from the plurality of beambook sets may include at least one of selecting the second beambook set from the plurality of beambook sets as the beambook set if the maximum transmitting power of the base station is not less than a first preset threshold and selecting the third beambook set from the plurality of beambook sets as the beambook set if the maximum transmitting power of the base station is not greater than a second preset threshold.

According to an embodiment, the at least one processor may be configured to configure the measurement reference signal for each first beam in the beambook set, wherein the measurement reference signal includes a synchronization signal block (SSB) reference signal.

According to an embodiment, the determining of the transmitting beam from the beambook set based on the reference signal measurement value reported by the UE may include determining the transmitting beam from the beambook set using a prediction model, based on the reference signal measurement value reported by the UE and a historical reference signal measurement value historically reported by the UE.

According to an embodiment, the at least one processor may be configured to transmit the beam information of the transmitting beam to the UE if the transmitting beam is the first beam.

According to an embodiment, the determining of the first beam corresponding to the transmitting beam may include determining the first beam corresponding to the transmitting beam based on a mapping relationship between the first beam and the second beam.

According to an embodiment, the mapping relationship between the first beam and the second beam may be established according to spatial correlation between the second beam and the first beam.

According to an embodiment, the determined first beam and the transmitting beam may have similar spatial beam directions.

According to an embodiment, the transmitting of the beam information of the determined first beam to the UE may include transmitting the beam information of the determined first beam to the UE based on a transmission configuration indication (TCI) state corresponding to the measurement reference signal.

According to an embodiment, a user equipment may include a communication unit and at least one processor connected to the communication unit and configured to control the communication unit to receive, from a base station, a measurement reference signal configured for a first beam in a beambook set, wherein the beambook set includes at least one first beam and at least one second beam; perform reference signal measurement on the measurement reference signal, and control the communication unit to report a reference signal measurement value to the base station, wherein the reference signal measurement value is used by the UE to determine a transmitting beam of the base station; control the communication unit to receive beam information of a first beam corresponding to the transmitting beam from the base station, if the transmitting beam is the second beam; determine a receiving beam of the UE based on the beam information, and control the communication unit to receive data from the base station using the determined receiving beam.

According to an embodiment, the at least one processor may be configured to receive the beam information of the transmitting beam from the base station if the transmitting beam is the first beam.

According to an embodiment, the first beam may be a beam that needs to be configured with the measurement reference signal, and the second beam may be a beam that does not need to be configured with the measurement reference signal.

According to an example embodiment, an electronic device may include at least one processor; and at least one memory storing computer executable instructions, wherein the computer executable instructions, when executed by the at least one processor, cause the at least one processor to perform the above wireless communication methods.

According to an example embodiment, a computer readable storage medium storing instructions is provided, the instructions, when executed by at least one processor, cause the at least one processor to perform the above wireless communication methods.

According to an example embodiment, a method performed by a base station, comprises transmitting a reference signal associated with a first beam in a beambook to a user equipment (UE), wherein the beambook comprises a first beam set including the first beam and a second beam set. The method comprises determining a transmitting beam of the first beam set and the second beam set based on measurement information including received power value of the reference signal received from the UE. The method comprises determining index of the first beam corresponding to the transmitting beam in case that the transmitting beam is a second beam included in the second beam set. The method comprises transmitting beam information including the index to the UE. The first beam is configured to measure the received power value. A signal transmitted using the first beam and a signal transmitted using the second beam are received using a receiving beam of the UE.

According to an example embodiment, a base station comprises a transceiver. The base station comprises at least one processor coupled to the transceiver. The at least one processor is configured to transmit a reference signal associated with a first beam in a beambook to a user equipment (UE), wherein the beambook comprises a first beam set including the first beam and a second beam set. The at least one processor is configured to determine a transmitting beam of the first beam set and the second beam set based on measurement information including received power value of the reference signal received from the UE. The at least one processor is configured to determine index of the first beam corresponding to the transmitting beam in case that the transmitting beam is a second beam included in the second beam set. The at least one processor is configured to transmit beam information including the index to the UE. The first beam is configured to measure the received power value. A signal transmitted using the first beam and a signal transmitted using the second beam are received using a receiving beam of the UE.

According to an example embodiment, a non-transitory computer-readable storage medium having stored thereon program instructions, the instructions, when executed by a processor, perform operations includes transmitting a reference signal associated with a first beam in a beambook to a user equipment (UE), wherein the beambook comprises a first beam set including the first beam and a second beam set. The instructions, when executed by the processor, perform operations includes determining a transmitting beam of the first beam set and the second beam set based on measurement information including received power value of the reference signal received from the UE. The instructions, when executed by the processor, perform operations includes determining index of the first beam corresponding to the transmitting beam in case that the transmitting beam is a second beam included in the second beam set. The instructions, when executed by the processor, perform operations includes transmitting beam information including the index to the UE. The first beam is configured to measure the received power value. A signal transmitted using the first beam and a signal transmitted using the second beam are received using a receiving beam of the UE.

The foregoing technical solutions provided by the example embodiments of the present disclosure may contribute, for example, to improving signal quality of the UE and reducing power consumption of communication.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate example embodiments consistent with the present disclosure, and together with the description, serve to explain the principles of the present disclosure and do not unduly limit the disclosure.

The above and/or other aspects of the disclosure will be more apparent by describing certain embodiments of the disclosure with reference to the accompanying drawings, in which:

FIG. 4 is a flowchart of an example wireless communication method performed by an example base station according to various embodiments;

FIG. 11B is a schematic diagram of an example input data format of a prediction model according to various embodiments;

FIG. 12A is an example mapping relationship table between predicted beams and indication beams when using a beambook set corresponding to an example enlarged virtual beambook type according to various embodiments;

FIG. 12B is an example mapping relationship table between predicted beams and indication beams when using a beambook set corresponding to a RS-reduced virtual beambook type according to various embodiments;

FIG. 15 is a flowchart of an example wireless communication method for an example user equipment according to various embodiments;

DETAILED DESCRIPTION

The following description with reference to the accompanying drawings is provided to assist in a comprehensive understanding of various example embodiments of the present disclosure as defined by the claims and their equivalents. It includes various specific details to assist in that understanding, but these are to be regarded as merely examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

The term "include" or "may include" refers to the existence of a corresponding disclosed function, operation or component which can be used in various example embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of an addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings corresponding to the contextual meanings in the relevant field of art, and are not to be interpreted to have ideal or excessively formal meanings unless clearly defined in the present disclosure.

Figure 1:
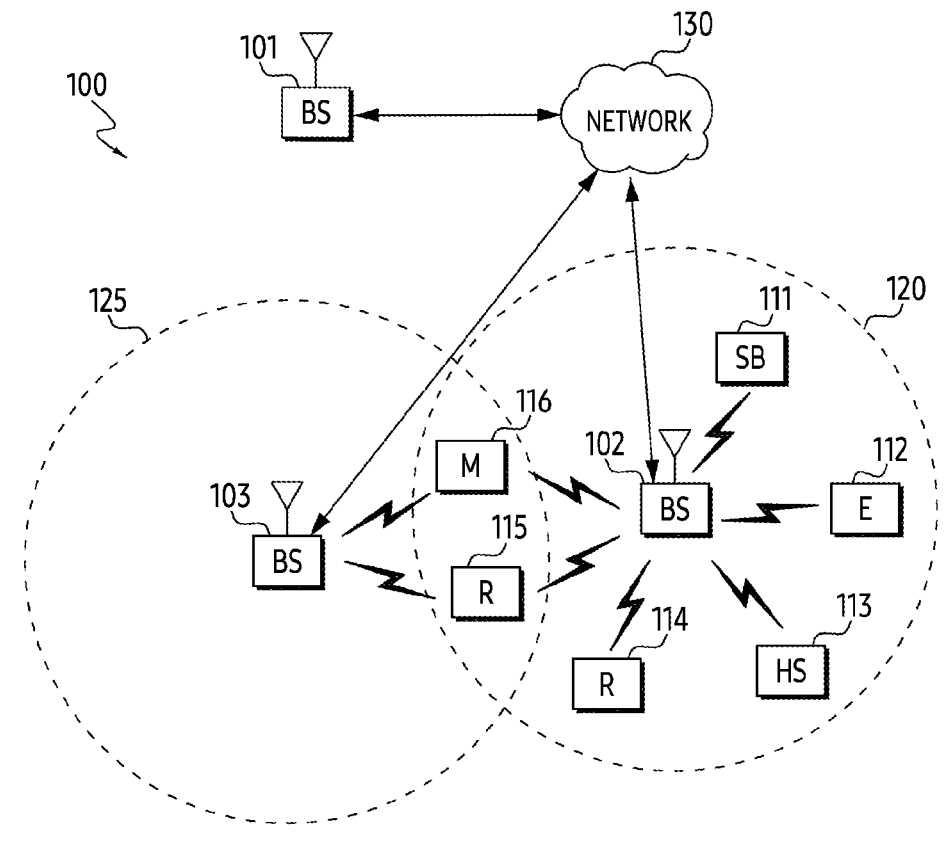
FIG. 1 illustrates an example wireless network 100 according to various embodiments.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103, gNB 101 communicates with gNB 102 and gNB 103, gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this disclosure to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this disclosure to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); and a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include the UE 115 and the UE 116. In various embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in example embodiments of the present disclosure. In various embodiments, one or more of gNB 101, gNB 102, and gNB 103 support beambook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
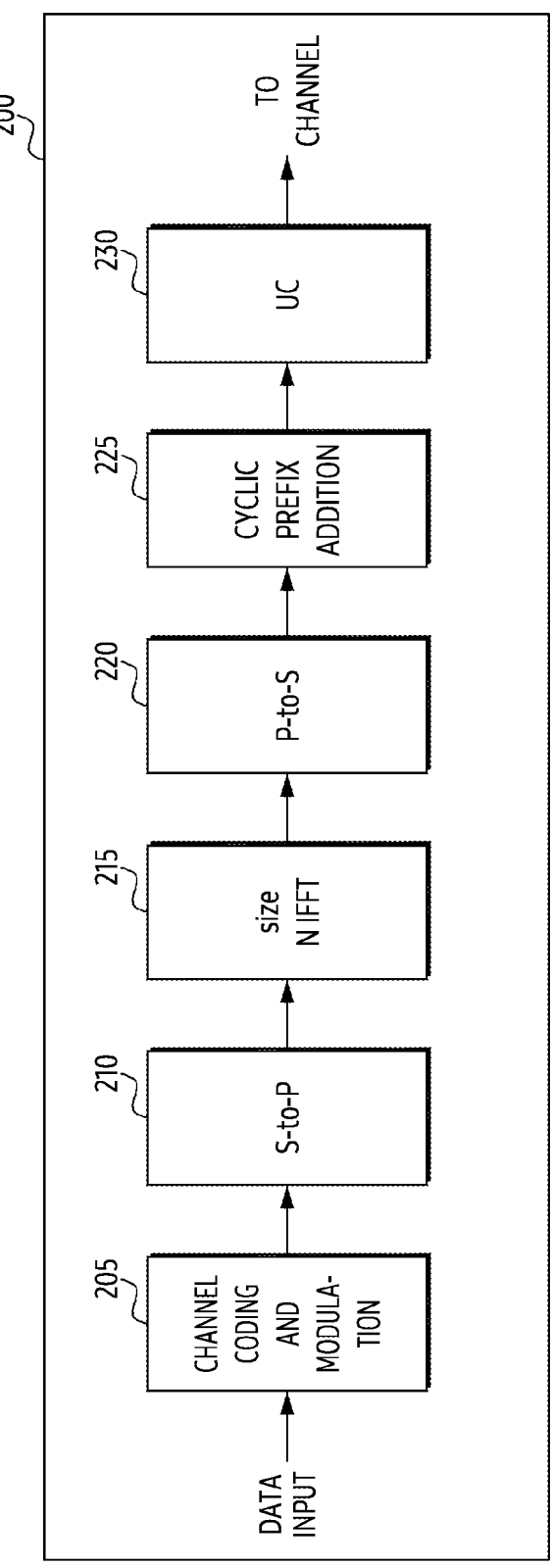
FIGS. 2A and 2B illustrate example wireless transmission and reception paths according to the present disclosure.
Figure 2B:
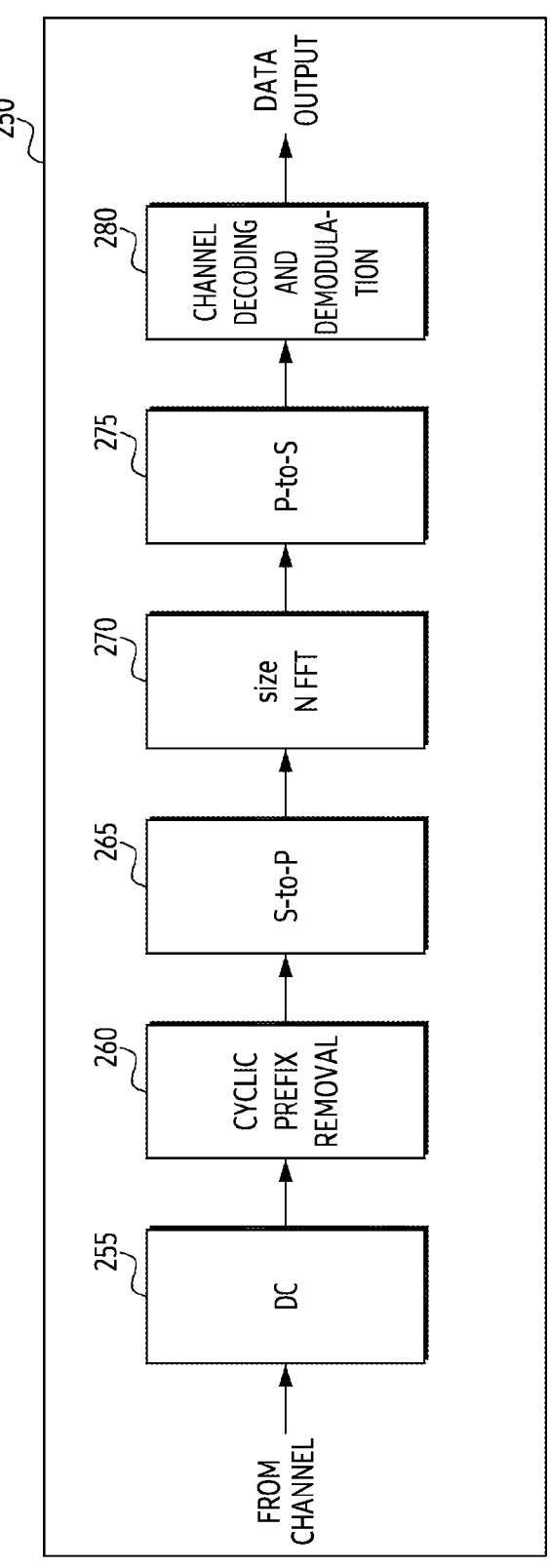

FIGS. 2A and 2B illustrate example wireless transmission and reception paths according to various embodiments. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In various embodiments, the reception path 250 is configured to support beambook designs and structures for systems with 2D antenna arrays as described in various embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
FIG. 3A illustrates an example UE 116 according to various embodiments.

FIG. 3A illustrates an example UE 116 according to various embodiments. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 (including, e.g., processing circuitry) can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In various embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in various embodiments of the disclosure. The processor/controller 340 can move data into or out of the memory 360 as required by an execution process. In various embodiments, the processor/controller 340 is configured to execute the application 362 based on the OS 361 or in response to signals received from the gNB or the operator. The processor/controller 340 is also coupled to an I/O interface 345, where the I/O interface 345 (including, e.g., input/output interface circuitry) provides UE 116 with the ability to connect to other devices such as laptop computers and handheld computers. I/O interface 345 is a communication path between these accessories and the processor/controller 340.

The processor/controller 340 is also coupled to the input device(s) 350 (including, e.g., input circuitry) and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
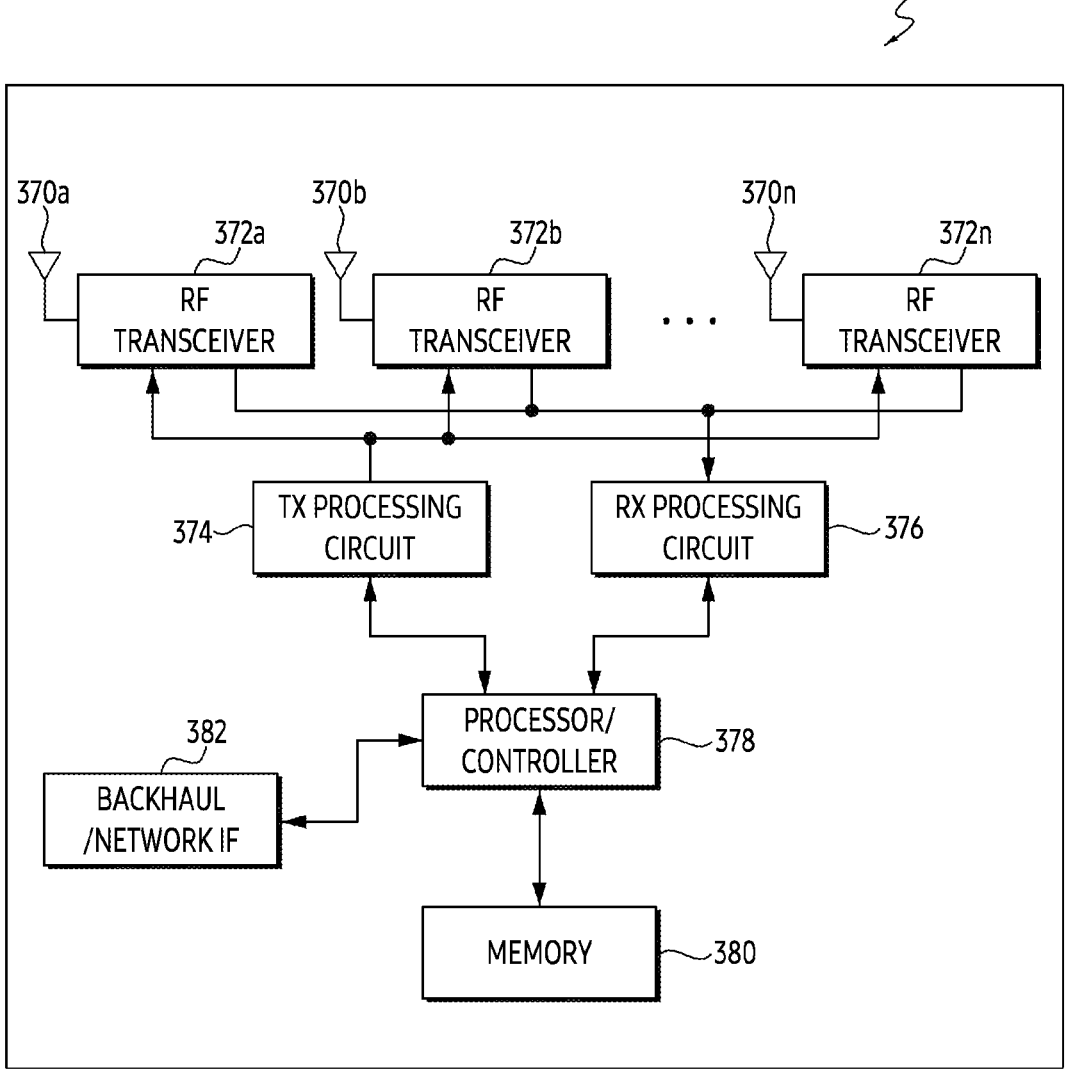
FIG. 3B illustrates an example gNB 102 according to various embodiments.

FIG. 3B illustrates an example gNB 102 according to various embodiments. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In various embodiments, one or more of the plurality of antennas 370a-370n include a 2D antenna array. gNB 102 also includes a controller/processor 378, a memory 380, and a backhaul or network interface (IF) 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The processor/controller 378 (including, e.g., processing circuitry) can include one or more processors or other processing devices that control the overall operation of gNB 102. For example, the processor/controller 378 can control the reception of forward channel signals and the transmission of backward channel signals through the RF transceivers 372a-372n, the RX processing circuit 376 and the TX processing circuit 374 according to well-known principles. The processor/controller 378 can also support additional functions, such as higher-level wireless communication functions. For example, the processor/controller 378 can perform a Blind Interference Sensing (BIS) process such as that performed through a BIS algorithm, and decode a received signal from which an interference signal is subtracted. A processor/controller 378 may support any of a variety of other functions in gNB 102. In various embodiments, the processor/controller 378 includes at least one microprocessor or microcontroller.

The processor/controller 378 is also capable of executing programs and other processes residing in the memory 380, such as a basic OS. The processor/controller 378 can also support channel quality measurement and reporting for systems with 2D antenna arrays as described in various embodiments of the disclosure. In various embodiments, the processor/controller 378 supports communication between entities such as web RTCs. The processor/controller 378 can move data into or out of the memory 380 as required by an execution process.

The processor/controller 378 is also coupled to the backhaul or network interface 382 (including, e.g., interface circuitry). The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the processor/controller 378. A part of the memory 380 can include an RAM, while another part of the memory 380 can include a flash memory or other ROMs. In various embodiments, a plurality of instructions, such as the BIS algorithm, are stored in the memory. The plurality of instructions are configured to cause the processor/controller 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3B. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

With the continuous development of mobile communication technologies, the required bandwidth is getting greater and the required frequency range is getting higher. A millimeter wave (mmWave) frequency band with abundant frequency resources will become the most mainstream frequency band in a new generation of mobile communication systems. However, a high frequency range of mmWave results in high signal transmission path loss. In order to overcome the high path loss caused by the high frequency, the new generation of mobile communication systems may, for example, use multi-antenna technology (MIMO) to enhance transmission signal quality and increase a data transmission rate.

The multi-antenna technology utilizes a multi-antenna array for beamforming to form beams with high gain and high directivity in a three-dimensional space. The beamforming is classified into analog beamforming and digital beamforming, both of which perform different amplitude and phase weighting of a same signal to form multi-channel signals, which are sent to different antenna elements for radiation so as to be synthesized as a desired pattern in a space. The difference between the analog beamforming and the digital beamforming is mainly in whether the amplitude and phase weighting operation is implemented in a digital domain or in an analog domain. Analog beamforming is simple to implement and has low hardware cost, but the disadvantage is that only one signal beam may be generated at the same time. The beamforming in this disclosure is described by way of example with respect to the analog beamforming.

Since a coverage range of a single beam in a three-dimensional space is very limited, multiple beams need to be designed to cover different spatial areas to ensure that there is a suitable beam in each direction to achieve a higher signal gain. In addition, the number of antenna elements determines a size of an antenna array. A large-scale antenna array needs to occupy a large space, in addition to the requirements of implementation complexity and power consumption, so it is easier to implement the multi-antenna technology at a base station (BS) side than at a terminal side or a User Equipment (UE) side. The example embodiments use the multi-antenna technology on the base station side.

However, when an environment between the base station and the UE changes, for example, the UE moves or an obstacle is disposed between the base station and the UE, an optimal transmitting beam on the base station side may also be changed. If switching of the optimal transmitting beam is not performed in time, it is very likely that the signal quality of the currently used beam transmission will be degraded, or even that the link will be interrupted. Therefore, the base station needs to continuously search for the optimal transmitting beam through a certain method, and when the transmission quality of the current beam is found to be significantly degraded, it may switch to other beams in time to maintain stable signal transmission quality.

The number of designed beams is directly related to a spatial coverage of a cell. The denser the beams are, the stronger the coverage capability is, but at the same time, hardware requirements are relatively high. Meanwhile, the more beams are, the more complicated the beam selection and management process, and the larger the processing delay.

At present, existing technical solutions for beambook design and beam selection/management on the network side are generally schemes for beambook type design and beam selection of full transmitting beam sweeping based on synchronization signal and physical broadcast channel block (SS/PBCH block, SSB) resources. That is, the base station pre-designs multiple transmitting beams, configures SSB resources for each transmitting beam in one-to-one correspondence, and then triggers the UE to perform reference signal received power (RSRP) measurement on all configured SSB resources and measurement results report, and then the base station selects a beam corresponding to a SSB sequence number with the highest RSRP value as the so-called or nominal optimal transmitting beam according to RSRP values reported by the UE, as well as being used for data transmission beam at the next moment.

However, since the number of SSBs that can be configured by a base station is currently limited to 64 at most, the number of SSB based beams in the beambook cannot exceed 64 at most. When cell load of the cell where the base station is located is heavy, and there are many cell-edge UEs, at this time, the optimal transmitting beam among the maximum 64 beams may not be well aligned with these cell-edge UEs. As a result, a beam coverage problem occurs, resulting in low signal quality for the cell-edge UEs, and ultimately in an excessively low throughput rate of the cell-edge UEs.

Another beambook type that has been discussed and adopted is a beambook type based on a mixture of SSB resources and channel state information-reference signal (CSI-RS) resources. For multiple transmitting beams designed by the base station, the SSB resources may be configured for a part of the transmitting beams in a one-to-one correspondence, and the CSI-RS resources may be configured for another part of the transmitting beams in a one-to-one correspondence, and then the UE is triggered to perform RSRP measurement on all the configured SSB resources and measurement results report, as well as perform RSRP measurement on all configured CSI-RS resources and measurement results report, and then the base station selects a beam corresponding to a SSB sequence number or a CSI-RS sequence number with the highest RSRP value of all as the so-called or nominal optimal transmitting beam according to SSB-based RSRP values and CSI-RS-based RSRP values reported by the UE, as well as being used for data transmission beam at the next moment.

The beambook type based on the mixture of SSB resources and CSI-RS resources can support a denser beam distribution. For example, 64 SSB based beams and 64 CSI-RS based beams may be designed, that is, 128 beams may be used to cover a coverage area of one base station sector. A dense beam distribution may solve the beam coverage problem of the cell-edge UEs to a certain extent, but it will bring a large amount of reference signal overhead and RRC signaling overhead, that is, additional RRC signaling needs to be configured to instruct the UE to perform measurement and reporting, while a large number of CSI-RS resources need to be configured and sent for the UE for RSRP measurement, which increases measurement burden of the UE and reduces available resources of data channels, and ultimately affects system throughput. In the above two technical solutions, measurement reference signals are configured for all beams in a fixed beambook set, for example, the beambook set includes fixed 64 beams or 128 beams, and all beams are configured with the measurement reference signals. Under this beam configuration, for example, when cell load of a cell where the base station is located is light, that is, when there are fewer UEs connected to the cell, most of the beams in the fixed beambook are not used for data transmission, and these beams still occupy a large amount of reference signals for beam measurement, so that the power of the base station is always at a high level, resulting in high power consumption.

In view of the above problems, the present disclosure provides a wireless communication solution. In the wireless communication solution, a beambook set includes at least one first beam and at least one second beam, and the base station can configure a measurement reference signal only for the first beam, and determine a transmitting beam based on a reference signal measurement value on the first beam; if the determined transmitting beam is the second beam, a first beam corresponding to the transmitting beam is further determined, and beam information of the further determined first beam is sent to the UE, so that even if the base station uses the second beam to send data to the UE, and the beam information notified to the UE is beam information of the first beam corresponding to the second beam, the UE can still use the first beam as the transmitting beam to determine a corresponding receiving beam, which receives data transmitted by using the transmitting beam, thereby reducing reference signal resource overhead for measurement while reducing power consumption for communication.

The example embodiments of the disclosure are further described below in conjunction with the accompanying drawings. The text and drawings are provided as examples only to help readers understand the disclosure. They are not intended and should not be interpreted as limiting the scope of the disclosure in any way. Although certain embodiments and examples have been provided, based on the content disclosed herein, it will be apparent to those skilled in the art that modifications to the illustrated embodiments and examples can be made without departing from the scope of the disclosure.

FIG. 4 is a flowchart of an example wireless communication method performed by a base station according to various embodiments.

Referring to FIG. 4, in step S410, a measurement reference signal configured for a first beam in a beambook set is transmitted to a user equipment (UE).

According to an embodiment, the beambook set includes at least one first beam and at least one second beam. In the following, the first beam is also referred to, for example, as a "regular beam", and the second beam is also referred to, for example, as a "virtual beam". According to an embodiment, the first beam is, for example, a beam that needs to be configured with the measurement reference signal, and the second beam is, for example, a beam that does not need to be configured with the measurement reference signal. The beambook set may, for example, be one beambook set among multiple beambook sets pre-designed by the base station. For example, the base station may design at least two beambook sets in advance, and preselect a corresponding beambook set according to actual conditions.

According to an embodiment, the wireless communication method further includes selecting the beambook set from a plurality of beambook sets. According to an embodiment, the plurality of beambook sets may include at least two of a first beambook set of a first beambook type, a second beambook set of a second beambook type, and/or a third beambook set of a third beambook type.

For example, the base station can select at least two types from the following three beambook types, and design the corresponding beambook set respectively.

The first beambook type is, for example, a basic beambook type. According to an embodiment, all beams in the first beambook set of the first beambook type are regular beams. Regular beams are beams that need to be configured with measurement reference signals, that is, the base station may configure corresponding measurement reference signals (for example, synchronization signal block (SSB) reference signals) for the regular beams in one-to-one correspondence, for the UE to perform reference signal measurement, for example, RSRP measurement.

Figure 5:
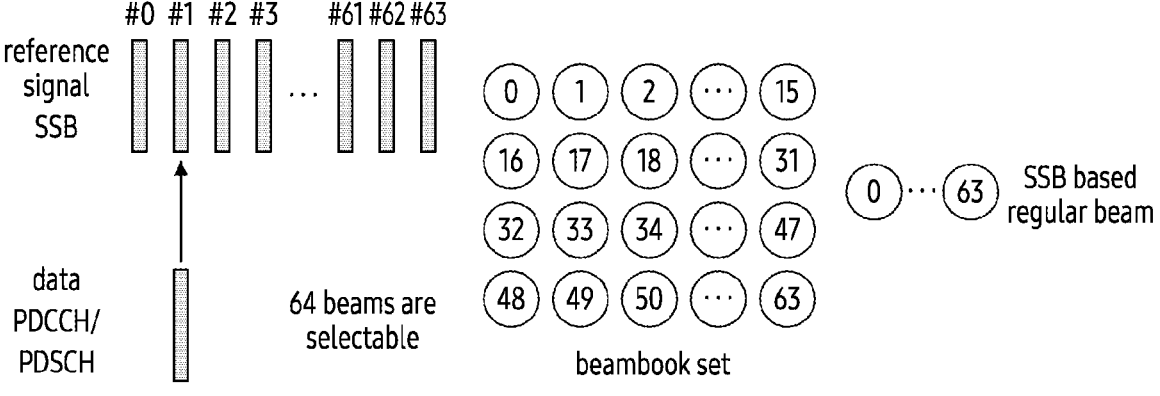
FIG. 5 is a schematic diagram of an example basic beambook type according to various embodiments.

A schematic diagram of an example basic beambook type is shown in FIG. 5, in which the beambook set has a total of 64 beams, and the numbers of the beams are #0, #1, . . . , #63. All 64 beams are regular beams, and the base station may configure 64 corresponding SSB reference signals for these beams, SSB #0, #1, . . . , #63, which are used for the UE to perform RSRP measurement. For example, the base station transmits SSB #0 with beam #0, transmits SSB #1 with beam #1, . . . , and transmits SSB #63 with beam #63. When the base station sends data, for example, when sending a physical downlink control channel (PDCCH) and a physical downlink shared channel (PDSCH), the base station selects one of the 64 beams according to a certain criteria to send the data.

Spatial direction information of the beam may be represented by two parameters, that is, a vertical direction angle and a horizontal direction angle. By drawing the vertical direction angle and the horizontal direction angle of the beam on a two-dimensional plane, the spatial direction information of the beam and relative spatial position information between the beams may be clearly displayed, wherein the vertical direction and the horizontal direction of the plane correspond to the vertical direction angle and the horizontal direction angle of the beam respectively.

Figure 6A:
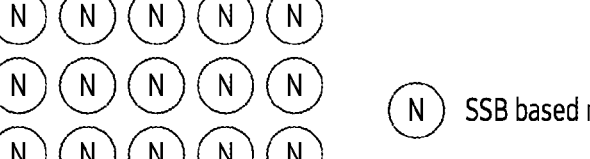
FIG. 6A is a schematic diagram of an example uniform beam direction design in a basic beambook type according to various embodiments.
Figure 6B:
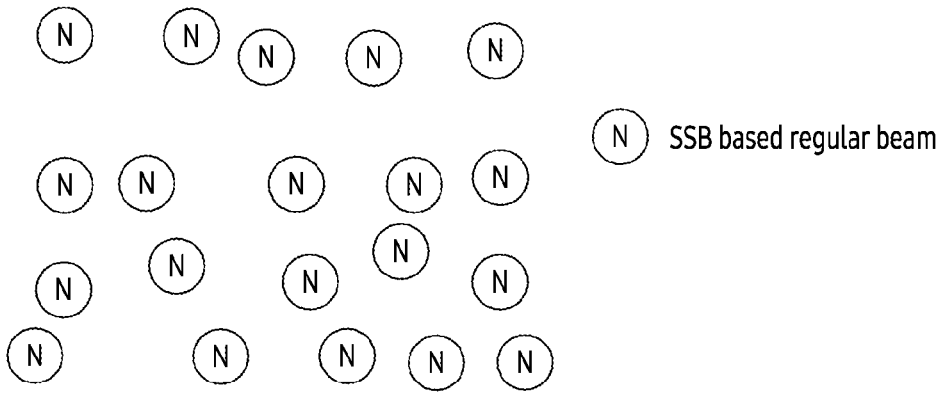
FIG. 6B is a schematic diagram of an example non-uniform beam direction design in a basic beambook type according to various embodiments.

There are two main ways to design a beam direction in the basic beambook type. One is a uniform beam direction design. FIG. 6A shows a schematic diagram of the uniform beam direction design. All beams are uniformly distributed on a two-dimensional plane, that is, difference for vertical direction angles between two adjacent beams and difference for horizontal direction angles between two adjacent beams are both basically same. Another is a non-uniform beam direction design. FIG. 6B shows a schematic diagram of a non-uniform beam direction design. Beams are randomly distributed in a two-dimensional plane, that is, difference for vertical direction angles between two adjacent beams is larger than a threshold gap and/or difference for horizontal direction angles between two adjacent beams is larger than a threshold gap.

The second beambook type is an enlarged virtual beambook type. According to an embodiment, the number of beams in the second beambook set of the second beambook type is greater than the number of beams in the first beambook set, and some of the beams in the second beambook set are regular beams and some other beams are virtual beams. For the regular beams, the base station configures corresponding measurement reference signals (e.g., SSB reference signals) in a one-to-one correspondence, while for the enlarged virtual beams, the base station does not configure corresponding measurement reference signals. That is to say, a regular beam is, for example, a beam that needs to be configured with a measurement reference signal, and a virtual beam is, for example, a beam that does not need to be configured with a measurement reference signal.

Figure 7:
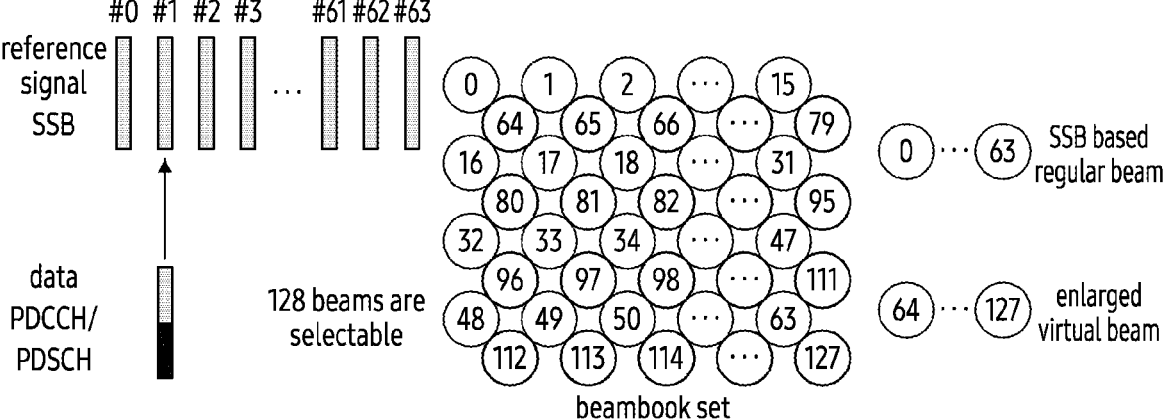
FIG. 7 is a schematic diagram of an example enlarged virtual beambook type according to various embodiments.

For example, FIG. 7 shows a schematic diagram of an example enlarged virtual beambook type. The beambook set in FIG. 7 has a total of 128 beams, and the beams are numbered #0, #1, . . . , #63, #64, #65, . . . , #127 respectively. Among these beams, the 64 beams (e.g., beam #0, #1, . . . , #63) are regular beams, and the base station may configure 64 corresponding SSB reference signals for these beams. For example, for SSB #0, #1, . . . , #63, #64, which are used by the UE to perform RSRP measurement, the base station transmits SSB #0 with beam #0, transmits SSB #1 with beam #1, . . . , and transmits SSB #63 with beam #63. The 64 beams numbered #64, #65, . . . , #127 are enlarged virtual beams, and the base station may not configure corresponding measurement reference signals for these virtual beams. When the base station sends data, for example, when sending a PDCCH and a PDSCH, the base station may select a possible beam from all 128 beams for data transmission according to a preset method. That is, the base station may select one from the 64 regular beams based on SSB resources and the 64 enlarged virtual beams for data transmission.

Compared with the first beambook type, the beambook set of the second beambook type is enlarged without increasing measurement resource overhead, and the spatial distribution of the beams is much denser. The base station may select an appropriate beam from a set of more beam candidates to transmit data to the UE, thereby improving the signal quality of the UE, especially for cell-edge UEs, which can effectively improve throughput.

Figure 8A:
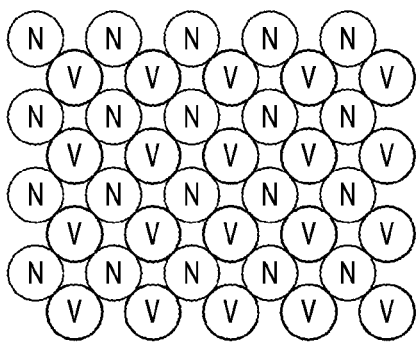
FIG. 8A is a schematic diagram of an example of a uniform beam direction design in an example enlarged virtual beambook type according to various embodiments.
Figure 8B:
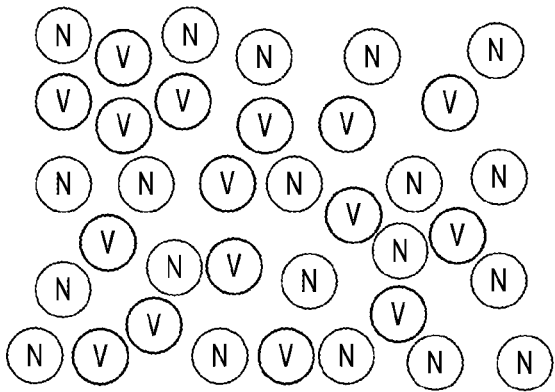
FIG. 8B is a schematic diagram of an example of a non-uniform beam direction design in an example enlarged virtual beambook type according to various embodiments.
Figure 8C:
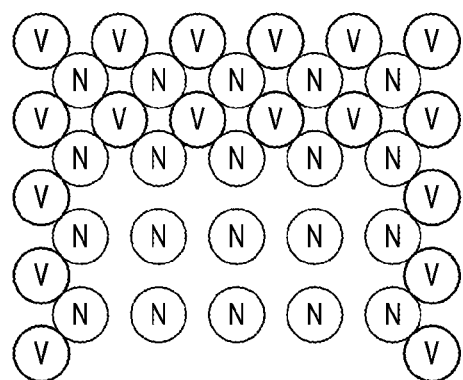
FIG. 8C is a schematic diagram of an example of a non-uniform beam direction design in an example enlarged virtual beambook type according to various embodiments.

For a design of a beam direction in the enlarged virtual beambook type, there are mainly two methods according to the difference in the design of the beam direction in the basic beambook type. The first is a uniform beam direction design. FIG. 8A is a schematic diagram of an example of a uniform beam direction design. As shown in FIG. 8A, regular beams are uniformly distributed in a two-dimensional plane, and beam directions of the virtual beams fill in to provide coverage at junctions of multiple adjacent regular beams, which is used to enhance coverage capability of the beams in the spatial directions of these junctions. The second is a non-uniform beam direction design. FIG. 8B is a schematic diagram illustrating an example of a non-uniform beam direction design, where regular beams are randomly distributed in a two-dimensional plane, and one or more virtual beams are added for the spatial directions where regular beams provide sparse coverage, and no virtual beams are added for the spatial directions where regular beams provide denser coverage. FIG. 8C is a schematic diagram illustrating another example of a non-uniform beam direction design. The beam direction design in this example focuses on cell-edge UEs. As shown in FIG. 8C, regular beams are uniformly distributed in a two-dimensional plane, while directions of virtual beams mainly point to areas covering the cell-edge UEs. In the type of the beam direction design that focuses on the cell-edge UEs, the design of the regular beam direction may also be non-uniform.

The third beambook type is a reference signal reduced virtual beambook type. According to an embodiment, the number of beams in the third beambook set of the third beambook type is equal to or smaller than the number of beams in the first beambook set, and some of the beams in the third beambook set are regular beams and some other ones of the beams are virtual beams. This beambook type is similar to the second enlarged virtual beambook type. Some of the beams are designed as regular beams, that is, the base station may configure corresponding measurement reference signals (for example, SSB reference signals) for these beams in a one-to-one correspondence; and, at the same time, some other ones of the beams are designed as reference signal reduced virtual beams, that is, the base station may not configure corresponding measurement reference signals for these beams. The main difference from the second enlarged virtual beambook type is that the number of beams in the reference signal reduced virtual beambook type is relatively small (e.g., the number of all beams is same as or similar to the number of regular beams in the first basic beambook type).

Figure 9:
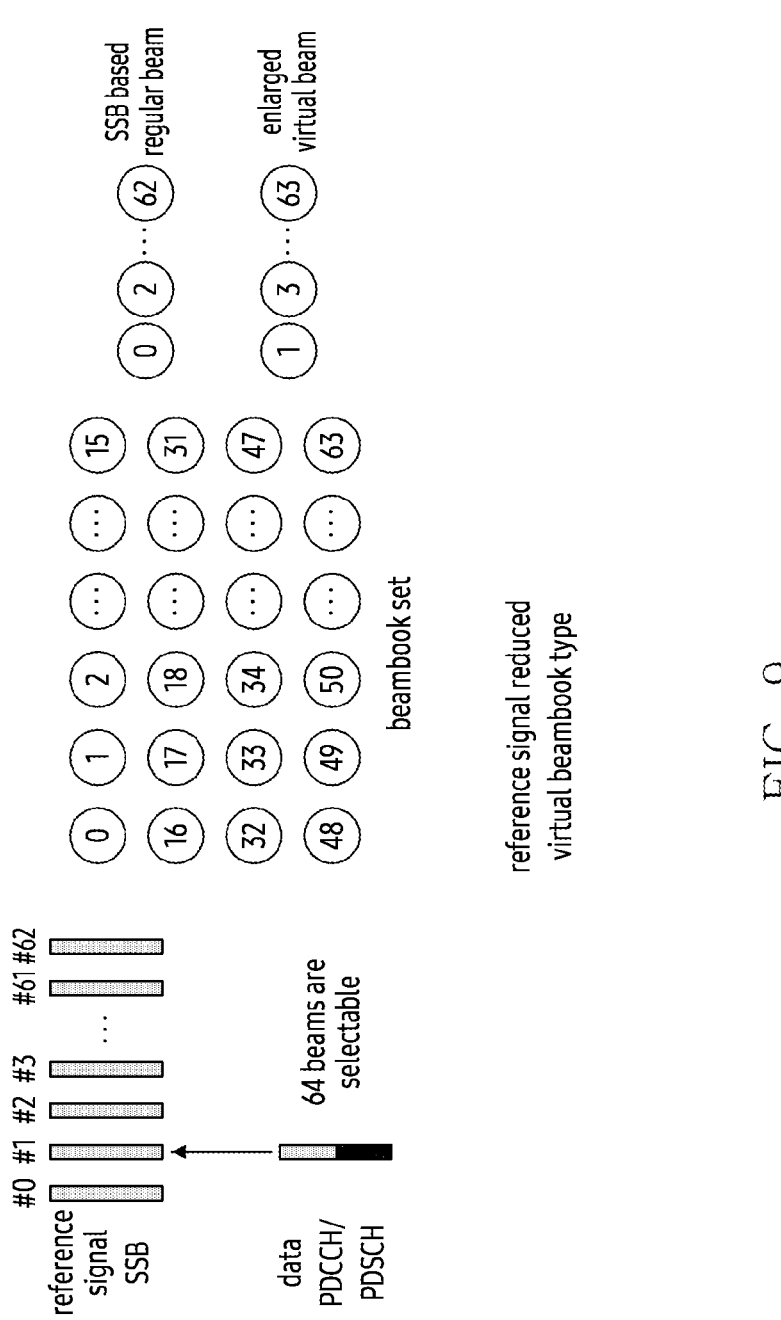
FIG. 9 is a schematic diagram of an example reference signal (RS) reduced virtual beambook type according to various embodiments.

For example, FIG. 9 is a schematic diagram of an example reference signal reduced virtual beambook type. As shown in FIG. 9, the beambook set in the figure has a total of 64 beams, and the beams are numbered #0, #1, . . . , #63 respectively. Among them, 32 beams (e.g., beams #0, #2, #4, . . . , #62) are regular beams, and the base station may configure 32 corresponding SSB reference signals for these beams (e.g., SSB #0, #2, #4, . . . , #62), which are used by the UE to perform RSRP measurement. For example, the base station transmits SSB #0 with beam #0, transmits SSB #2 with beam #2, transmits SSB #4 with beam #4, . . . , transmits SSB #62 with beam #62. Among them, 32 beams (e.g., beams #1, #3, #5, . . . , #63) are RS reduced virtual beams, and the base station may not configure corresponding measurement reference signals for these virtual beams. When the base station sends data, for example, when sending a PDCCH and a PDSCH, the base station may select a possible beam from all 64 beams for data transmission according to a preset method. That is, it may select a beam from the 32 regular beams and the 32 RS reduced beams for data transmission.

Compared with the first beambook type, the third beambook type can reduce overhead of measurement resources, reduce transmission power of the base station, and reduce measurement burden of the UE while keeping the number of available beams unchanged, thereby reducing power consumption of the base station and the UE.

A design method of a beam direction in the reference signal reduced virtual beambook type is the same as the design method of the beam direction in the enlarged virtual beambook type, and is not repeated here.

After pre-designing at least two beambook sets, the base station selects an appropriate beambook set from the at least two pre-designed beambook sets according to actual situations. For example, the beambook set may be selected from the plurality of beambook sets based on at least one of: cell load of a cell where the base station is located, a distribution of UEs in the cell or a maximum transmitting power of the base station. There are two main methods for selecting the beambook set.

According to an embodiment, selecting the beambook set from the plurality of beambook sets may include: selecting the second beambook set from the plurality of beambook sets as the beambook set if a first condition is satisfied, wherein the first condition is that the cell load is greater than a first threshold and the number of UEs located at the edge of the cell is greater than a second threshold; and/or selecting the third beambook set from the plurality of beambook sets as the beambook set if a second condition is satisfied, wherein the second condition is that the cell load is less than a third threshold.

Figure 10A:
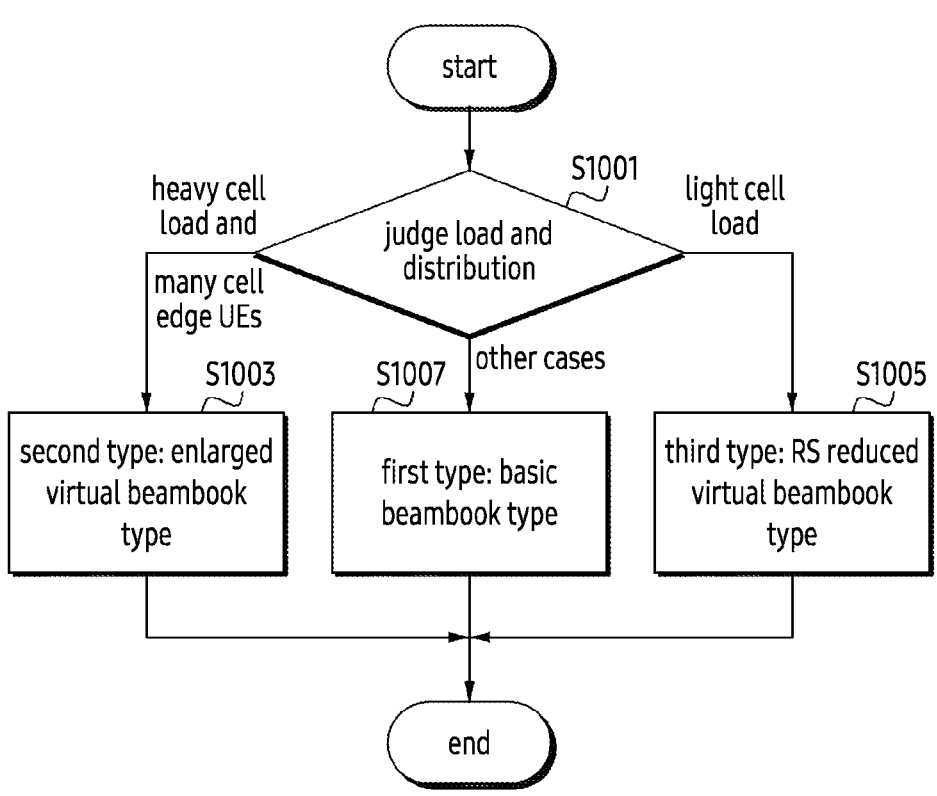
FIG. 10A is a flowchart of an example beambook set selection method based on cell load and a distribution of UEs according to various embodiments.
Figure 10B:
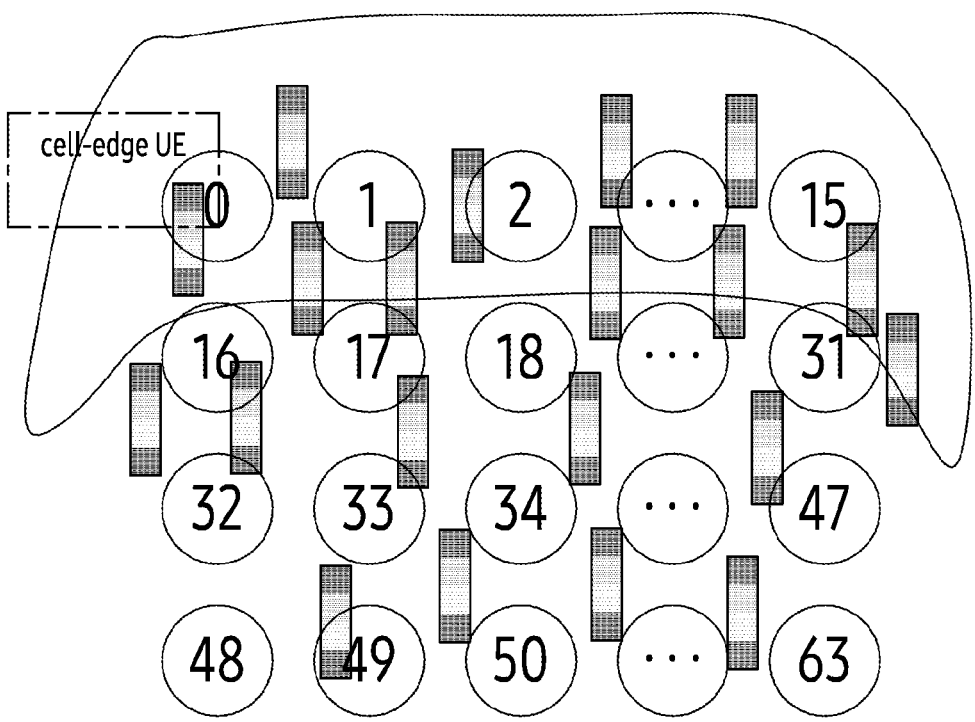
FIG. 10B is a schematic diagram of heavy cell load and many cell edge UEs according to various embodiments.
Figure 10C:
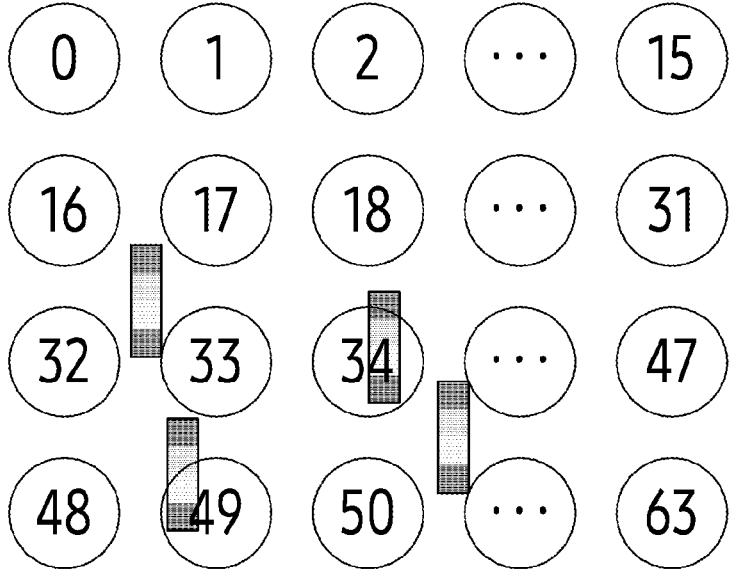
FIG. 10C is a schematic diagram of light cell load according to various embodiments.

For example, FIG. 10A shows a flowchart of an example beambook set selection method based on the cell load and the distribution of UEs. When the cell load is determined to be heavy at S1001 (for example, the cell load is greater than the first threshold) and there are many cell-edge UEs (for example, the number of cell-edge UEs is greater than the second threshold), as shown in FIG. 10B, at this time, a beambook set corresponding to the enlarged virtual beambook type may be adopted at S1003 to increase the number of available beams without increasing the measurement resource overhead. In this way, the base station can select a more suitable beam for the UE, thereby improving the signal quality of the UE, especially for cell-edge UEs, and the throughput thereof can be effectively improved. When the cell load is light (for example, the cell load is less than the third threshold), as shown in FIG. 10C, a beambook set corresponding to the RS reduced virtual beambook type may be adopted at S1005 to reduce overhead of measurement resources, reduce transmission power of the base station, reduce measurement burden of the UE, in the case of keeping the number of available beams unchanged, thereby reducing power consumption of the base station and the UE. In other cases, a beambook set corresponding to the basic beambook type is adopted at S1007 to ensure normal operation of the system.

In an embodiment, the weight of the cell load and the distribution of UEs may be determined by the following example method. The number $N_{UE,connected}$ of UE accesses in a single cell for a period of time T1 is counted. When the number of UE accesses in the single cell is greater than a preset threshold $N_{thr,high}$, the load of the cell is determined to be "heavy". That is, when $N_{EE,connected} > N_{thr,high}$ is satisfied, the load of the cell is determined to be heavy. At the same time, the number $N_{UE,cell-edge}$ of UEs that become cell-edge UEs among the $N_{UE,connected}$ UEs accessing the cell in the period of time T1 is counted. When the proportion of cell-edge UEs is greater than a preset threshold $f_{thr}$, it is considered that there are relatively many cell-edge UEs, that is, when is $$\frac{N_{UE,cell-edge}}{N_{UE,connected}} > f_{thr}$$

satisfied, it is determined that there are relatively many cell-edge UEs. In an embodiment, whether a UE is a cell-edge UE may be determined by the following method. When an average RSRP value of a certain UE in a period of time T2 is lower than a preset threshold $RSRP_{thr}$, the UE is considered to be a cell-edge UE. When cell load is heavy and there are many cell-edge UEs, a beambook set corresponding to the enlarged virtual beambook type is adopted.

$N_{thr,high}$ is a preset threshold of the base station, and the range of the threshold may be, for example, an integer between ten and dozens. The smaller the value of $N_{thr,high}$, the easier it is to select the beambook set corresponding to the enlarged virtual beambook type. The larger the value of $N_{thr,high}$, the harder it is to select the beambook set corresponding to the enlarged virtual beambook type. $f_{thr}$ is another threshold preset by the base station, and this threshold may range, for example, as a decimal between 0 and 1. The smaller the value of $f_{thr}$, the easier it is to select the beambook set corresponding to the enlarged virtual beambook type. The larger the value of $f_{thr}$, the harder it is to select the beambook set corresponding to the enlarged virtual beambook type. The default value of $f_{thr}$ may be set to $f_{thr}$=0.3. $RSRP_{thr}$ is another threshold preset by the base station. The larger the value of $RSRP_{thr}$, the easier the UE is to be determined as a cell-edge UE, so it is easier to select the beambook set corresponding to the RS reduced virtual beambook type. The smaller the value of $RSRP_{thr}$, the harder it is for the UE to be determined as the cell-edge UE, so it is harder to select the beambook set corresponding to the RS reduced virtual beambook type.

In an embodiment, when the counted number $N_{UE,connected}$ of UE accesses in the period of time T1 is less than a preset threshold $N_{thr,low}$, the load of the cell is considered to be light. That is, when $N_{UE,connected} < N_{thr,low}$ is satisfied, the load of the cell is determined to be light. When the load of the cell is light, the beambook set corresponding to the RS reduced virtual beambook type is adopted.

$N_{thr,low}$ is another threshold preset by the base station, and this threshold may, for example, be an integer ranging between several and a dozen. The larger the value of $N_{thr,low}$, the easier it is to select the beambook set corresponding to the RS reduced virtual beambook type. The smaller the value of $N_{thr,low}$, the harder it is to select the beambook set corresponding to the RS reduced virtual beambook type.

In other cases other than the above cases, the beambook set corresponding to the basic beambook type can be adopted.

Figure 10D:
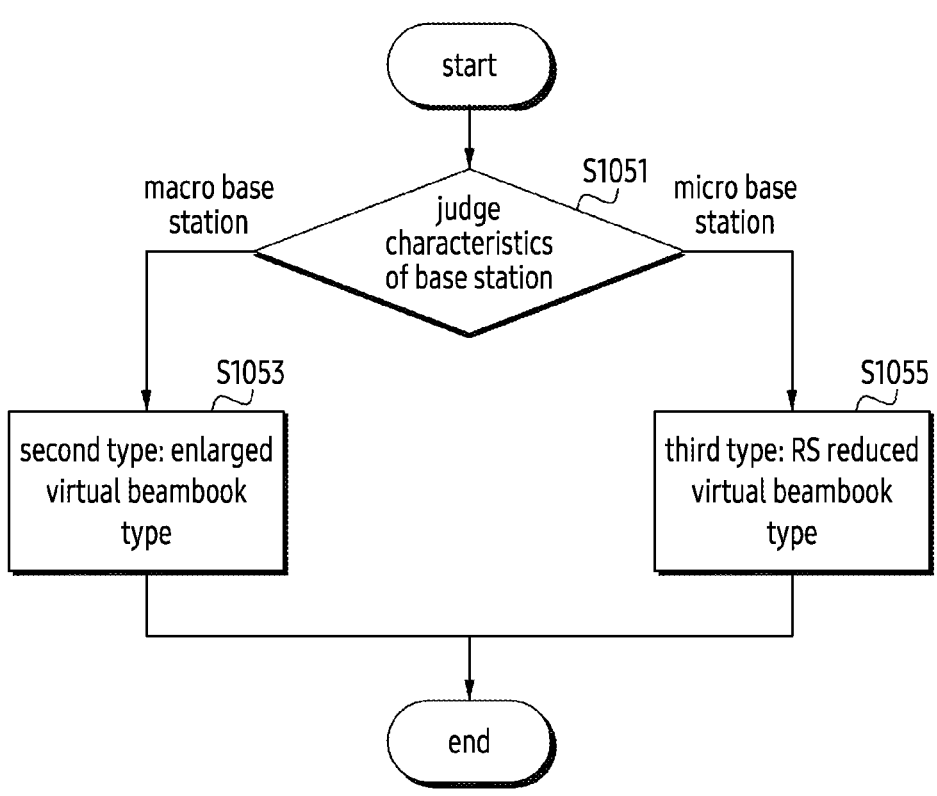
FIG. 10D is a flowchart illustrating an example method of selecting a beambook set selection based on characteristics of a base station according to various embodiments.

FIG. 10D is a flowchart illustrating an example method of selecting a beambook set from a plurality of beambook sets based on characteristics of the base station, according to various embodiments. At 1051, the characteristics of the base station are judged. For example, the characteristics of the base station may include, for example, a maximum transmitting power of the base station. According to an embodiment, if the maximum transmitting power of the base station is determined to be not less than a first preset threshold at S1051, a second beambook set is selected from the plurality of beambook sets as the beambook set at S1053. If the maximum transmitting power of the base station is not greater than a second preset threshold at S1051, a third beambook set is selected from the plurality of beambook sets as the beambook set at S1055. If a base station whose maximum transmitting power is not less than the first preset threshold is defined as a macro base station, and a base station whose maximum transmitting power is not greater than the second preset threshold is defined as a micro base station, as shown in FIG. 10D, for example, for a high-power base station (e.g., a macro base station) used in a macro cell, the beambook set corresponding to the enlarged virtual beambook type is fixedly used to increase the number of available beams, improve the signal quality of the UE, and improve its throughput rate. For a low-power base station (e.g., a micro base station) used in a micro cell, the beambook set corresponding to the RS reduced virtual beambook type is fixedly used to reduce the overhead of measurement resources and the transmitting power of the base station, so as to reduce the power consumption of the base station.

Referring back to FIG. 4, in step S410, the measurement reference signal configured for the first beam in the beambook set is transmitted to the user equipment (UE). Alternatively, according to an embodiment, before step S410, the method may further include configuring the measurement reference signal for each first beam in the beambook set, wherein the measurement reference signal includes a synchronization signal block (SSB) reference signal.

If the beambook set is the second enlarged virtual beambook type, that is, some of the beams are regular beams and some other ones of the beams are enlarged virtual beams, the base station only configures corresponding SSB reference signals for the regular beams in a one-to-one correspondence for RSRP measurement, and may not configure corresponding measurement reference signals for the enlarged virtual beams; if the beambook set is the third RS-reduced virtual beambook type, that is, some of the beams are regular beams, and some other ones of the beams are RS reduced virtual beams, the base station only configures corresponding SSB reference signals for the regular beams in a one-to-one correspondence for RSRP measurement, and does not configure corresponding measurement reference signals for the RS reduced virtual beams, which is similar to the measurement reference signal configuration principle of the second enlarged virtual beambook type. Alternatively, the wireless communication method shown in FIG. 4 may further include selecting a beambook set of the basic beambook type from the plurality of beambook sets, in which case, all regular beams in the beambook set may be configured for corresponding SSB reference signals for RSRP measurement.

The specific method of configuring a SSB measurement reference signal is that the base station reserves a certain time-frequency resource for each beam that needs to configure the SSB measurement reference signal, and sends configuration information such as a location of the reserved time-frequency resource and a transmission period to the UE through a RRC message. At the same time, the base station may also send information such as a list of SSB resources that the UE needs to measure (for example, the list may contain N=64 SSB sequence numbers), the number of SSBs to be reported (for example, the number of reports M=4), a reporting period and other information to the UE through the RRC message. When the reserved time arrives, the base station uses a corresponding beam at each reserved time-frequency resource position to send a SSB signal, that is, performs the beamforming for the SSB signal using a beam weight corresponding to this beam in the beambook set.

Correspondingly, after receiving the above configuration message, the UE may perform RSRP measurement on each configured SSB resource (for example, perform RSRP measurement on N=64 SSB resources), to obtain the RSRP value of the corresponding beam, and report the highest M RSRP values obtained by the measurement and the corresponding SSB sequence numbers to the base station.

Next, in step S420, the base station determines a transmitting beam from the beambook set based on a reference signal measurement value reported by the UE. Specifically, for example, the base station determines the transmitting beam from the beambook set using a prediction model, based on the reference signal measurement value reported by the UE and a historical reference signal measurement value historically reported by the UE. In an embodiment, when the selected beambook set is the first beambook set, the beam corresponding to the highest measurement value in the reference signal measurement values may be determined as the transmitting beam.

In an embodiment, the reference signal measurement value may be an RSRP measurement value, or may be other measurement values, for example, a reference signal received quality (RSRQ) measurement value, a signal to interference plus noise ratio (SINR) measurement value, etc.

For example, when the base station adopts the first basic beambook type, the base station uses a beam corresponding to the highest RSRP value among M RSRP values reported by the UE as an optimal transmitting beam, and uses it as a transmitting beam for data transmission at the next moment. When the base station adopts the second enlarged virtual beambook type or the third RS reduced virtual beambook type, the base station converts M RSRP values and the corresponding SSB sequence numbers reported by the UE into RSRP values corresponding to M beams, and then inputs currently obtained RSRP values of M beams reported by the UE and one or more times of historically obtained RSRP values of M beams reported by the UE, after certain data preprocessing, into a preset prediction model. The optimal transmitting beam is predicted from all beam sets (including N regular beams and N1 virtual beams), and is used as a transmitting beam for data transmission at the next moment.

In an embodiment, when the base station adopts the second enlarged virtual beambook type, the base station configures N (for example, N=64) SSB resources corresponding to N regular beams, for the UE. After measurement, the UE reports M (for example, M=4) RSRPs with the largest RSRP values and the corresponding SSB sequence numbers to the base station. That is, the base station regards M beams in N regular beams as valid RSRP values, and regards the remaining N–M (for example, N–M=64–4=60) beams as invalid RSRP values, which are set to preset default values. Then, the base station inputs currently obtained N RSRP values (including M valid values) and one or more times of historically obtained N RSRP values into the preset prediction model, the optimal transmitting beam is predicted from all N regular beams and N1 (for example, N1=64) virtual beams.

In an embodiment, when the base station adopts the third RS-reduced virtual beambook type, the base station reconfigures N (for example, N=32) SSB resources, corresponding to N regular beams, for the UE. After measurement, the UE reports M (for example, M=4) RSRPs with the largest RSRP values and the corresponding SSB sequence numbers to the base station. At this time, the base station considers M beams in N regular beams as valid RSRP values, and considers the remaining N–M (for example, N–M=32–4=28) beams as invalid RSRP values, which are set to preset default values. Then, the base station inputs currently obtained N RSRP values (including M valid values and N–M invalid values) and one or more times of historically obtained N RSRP values into the preset prediction model, and the optimal transmitting beam is predicted from all N regular beams and N1 (e.g., N1=32) virtual beams.

In an embodiment, in a case that the base station uses the beambook set corresponding to the second enlarged virtual beambook type and in a case that the base station uses the beambook set corresponding to the third RS reduced virtual beambook type, because the configuration numbers of the SSB measurement reference signals are different. Thus, the beam numbers corresponding to M RSRP values reported by the UE belong to different ranges, and the number M of RSRP values reported by the UE may also be different, resulting in different forms of input data for the model. Therefore, for these two cases, corresponding prediction models need to be set separately.

According to an embodiment, the preset prediction model includes, but is not limited to, the following machine learning models. A deep neural network model based on supervised learning, and the neural network model is a bidirectional long short-term memory network model (Bi-LSTM). The LSTM neural network model is good at extracting a feature change trend at different time steps in a sequence (such as text, speech, etc.), and the input of the prediction model in the present disclosure is currently obtained RSRP values of M beams reported by the UE and one or more times of historically obtained RSRP values of M beams reported by the UE, including change information of RSRP on each beam over time. Therefore, the RSRP change trend on each beam may be effectively extracted using the LSTM neural network model, so as to predict the optimal beam at the next moment.

According to an embodiment, the prediction result obtained by the base station through the preset prediction model may include at least one of an optimal transmitting beam for serving the UE; a ranking situation of multiple transmitting beams for serving the UE; or RSRP values of multiple transmitting beams for serving the UE. If the predicted result is the ranking situation of the multiple transmitting beams for serving the UE and/or the RSRP values of the multiple transmitting beams for serving the UE, the optimal transmitting beam may be further determined according to the ranking situation and/or the RSRP values of the multiple transmitting beams. For example, a transmitting beam with the highest ranking may, for example, be determined as the optimal transmitting beam, or a transmitting beam with the largest RSRP value may, for example, be determined as the optimal transmitting beam.

According to an embodiment, the preset prediction model is obtained through pre-offline training and/or real-time online training. The offline training process may, for example, be that the base station pre-trains a preset prediction model according to typical antenna configuration, beam configuration, etc. of the base station before using the solution provided by the present disclosure, to obtain the trained model. The online training process may, for example, be that the base station further trains or optimizes the pre-trained initial model according to optimized beam configuration of the base station, surrounding actual application environment (such as a distribution of roads, an occlusion of buildings), etc., after deploying an actual environment, so that the optimized online training model is more in line with the influence of factors such as actual beam configuration and application environment of each base station.

Figure 11A:
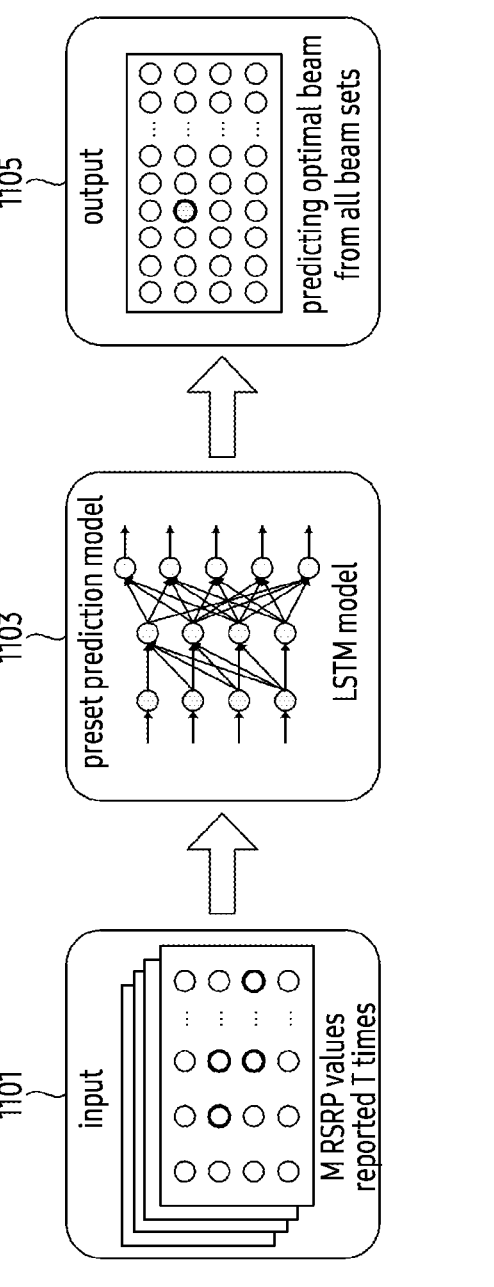
FIG. 11A is a schematic diagram of an example prediction process of an example optimal transmit beam according to various embodiments.

FIG. 11A is a schematic diagram of a prediction process of an optimal transmitting beam, according to various embodiments. The left box 1101 is data input to a prediction model, and contains T overlapping boxes, which are represented as RSRP values of T time steps (that is, RSRP values reported by the UE obtained in the last T times). The middle box 1103 is a preset prediction model, such as a deep neural network model based on supervised learning, and its neural network model is a bidirectional LSTM model. The RSRP values of T time steps obtained in the left box are input into the preset prediction model to perform prediction of an optimal transmitting beam. The right box 1105 is prediction output of the prediction model, and the output result is the optimal transmitting beam among all N regular beams and N1 (for example, N1=64) virtual beams.

FIG. 11B is a schematic diagram of input data format of the prediction model. The T boxes 1121 in the figure represent RSRP values of T time steps, that is, the RSRP values reported by the UE obtained in the last T times, including RSRP values currently obtained once and RSRP values historically obtained T–1 times. The time steps are numbered #i–(T–1), #i–(T–2), #i–1, #i, there are a total of N (for example, N=64) circles in each box, wherein N circles represent RSRP values of N transmitting beams, which include M (M=4) solid circles, representing RSRP values of M beams reported by the UE, and N–M (for example, N–M=60) dotted circles, representing that RSRP values of the remaining N–M beams, which are set to default values. The values form a two-dimensional table 1123 with T rows*N columns, as the input data of the prediction model. For example, the first row is RSRP values of time step #i–(T–1), in which four RSRP values of beam #0, #1, #4, #5 are valid values, namely RSRP_0, RSRP_1, RSRP_4, RSRP_5, and RSRP values of the remaining N–4 beams are default values.

Here, through the RSRP measurement results on the regular beams, the optimal transmitting beam may be predicted from all regular beams and virtual beams. This is mainly because the link from the base station to the UE has a high probability of a line-of-sight (LoS) in the millimeter wave system, so that the virtual beam has a strong spatial correlation with the similar regular beam. That is, there is a strong correlation between the RSRP value of the virtual beam and the RSRP value of the similar regular beam. The RSRP measurement values of multiple time steps may reflect the moving trajectory of the UE. The geographic location of the next moment is inferred, combined with the current motion state of the UE. With the help of the prediction model, the optimal transmitting beam in all beam sets may be predicted through the RSRP measurement results on partial beams.

After determining the transmitting beam, in step S430, if the transmitting beam is the second beam, a first beam corresponding to the transmitting beam is determined, and beam information of the determined first beam is transmitted to the UE.

According to an embodiment, the first beam corresponding to the transmitting beam may be determined based on a mapping relationship between first beams and second beams. For example, the mapping relationship between the first beams and the second beams may be established according to a spatial correlation between the second beams and the first beams. The spatial correlation may include, but is not limited to, spatial correlation of beam directions. For example, the determined first beam may have a similar spatial beam direction to the transmitting beam.

For example, when the base station uses the beambook set corresponding to the second enlarged virtual beambook type, or uses the beambook set corresponding to the third RS reduced virtual beambook type, beams used for RSRP measurement are regular beams, while beams used for data transmission predicted by the prediction model may be regular beams or virtual beams. When the predicted beam is a regular beam, the base station can directly notify the UE of relevant information of the beam. When the predicted beam is a virtual beam, the base station needs to map the virtual beam into a corresponding regular beam, and then notify the UE of the relevant information of the regular beam.

That is to say, through a mapping relationship between virtual beams and regular beams, a mapping relationship between predicted beams and indication beams may be obtained, so that when the predicted beam is a virtual beam, a corresponding regular beam may be found and notified to the UE. Here, the optimal transmitting beam predicted by the prediction model may be referred to, for example, as the predicted beam, and a beam whose relevant information needs to be notified to the UE may be referred to, for example, as the indication beam.

The mapping relationship between the virtual beams and the regular beams is preset according to the spatial correlation of the two. For example, a virtual beam may be mapped to a regular beam having a similar spatial beam direction. Specifically, if the base station uses the beambook set corresponding to the second enlarged virtual beambook type, and the spatial direction relationship between the virtual beams and the regular beams is shown in FIG. 7, the mapping relationship between the predicted beams and the indication beams may be designed as a mapping table in FIG. 12A. For example, if a predicted beam is beam #1 in the regular beam set, a mapped indication beam is beam #1, that is, the base station notifies the UE of the relevant information of beam #1; if a predicted beam is beam #65 in the enlarged virtual beam set, a mapped indication beam is beam #1, that is, the base station notifies the UE of the relevant information of the regular beam #1 corresponding to the virtual beam #65.

If the base station uses the beambook set corresponding to the third RS-reduced virtual beambook type, and the spatial direction relationship between the virtual beams and the regular beams is as shown in FIG. 9, the mapping relationship between the predicted beams and the indication beams may be designed as a mapping table in FIG. 12B. For example, if a predicted beam is beam #2 in the regular beam set, a mapped indication beam is beam #2. That is, the base station notifies the UE of the relevant information of beam #2. If a predicted beam is beam #3 in the RS reduced virtual beam set, a mapped indication beam is beam #2, that is, the base station notifies the UE of the relevant information of the regular beam #2 corresponding to the virtual beam #3.

Here, it is transparent to the UE that the base station uses the virtual beam to send data to the UE, because the beam notified by the base station to the UE is the mapped regular beam, and the UE still uses the regular beam as the transmitting beam to determine the corresponding receiving beam and to receive data from the transmitting beam. The UE itself does not know that the data was actually sent by the virtual beam.

According to an embodiment, the transmitting of the beam information of the determined first beam to the UE may include transmitting the beam information of the determined first beam to the UE based on a transmission configuration indication (TCI) state corresponding to the measurement reference signal. For example, a method for the base station to transmit the beam information of the determined first beam to the UE may include, but is not limited to, using a TCI-State information element (IE) to indicate transmitting the beam information of the determined transmitting beam.

Before performing beam indication, the base station may pre-configure multiple TCI-State IEs and corresponding tracking reference signals (TRS). Each TCI-State IE includes information such as a TCI-State ID, a source cell ID, a source cell frequency band range, a source reference signal ID, and/or a quasi-co-location type. The quasi-co-location type includes four types A, B, C, and D. In the present disclosure, the quasi-co-location type may be, for example, the quasi-co-location type D. When a target reference signal is configured with a TCI-State of quasi-co-location type D, the target reference signal and the source reference signal may have similar spatial reception parameters. That is, the UE may use the same receiving beam to receive the target reference signal and the source reference signal.

For example, if the base station uses the beambook set corresponding to the second enlarged virtual beambook type, there are 128 beams in the beambook set, including 64 regular beams and 64 virtual beams. The base station configures corresponding SSB reference signals for the 64 regular beams in a one-to-one correspondence, and pre-configures 64 SSB-based TCI-States, each TCI-State corresponding to a corresponding SSB reference signal respectively. That is, a source reference signal ID is set to a corresponding SSB sequence number. At the same time, the base station may also configure corresponding TRSs for the 64 regular beams in a one-to-one correspondence, and pre-configure 64 TRS-based TCI-States, each TCI-State corresponding to a corresponding TRS respectively That is, the source reference signal ID in the TCI-State IE is set to a corresponding TRS sequence number.

The beam indication may be performed at the same time as transmitting data, and the base station may indicate a TCI-State ID currently used by the UE while transmitting data, so as to indicate corresponding transmitting beam information.

Figure 13:
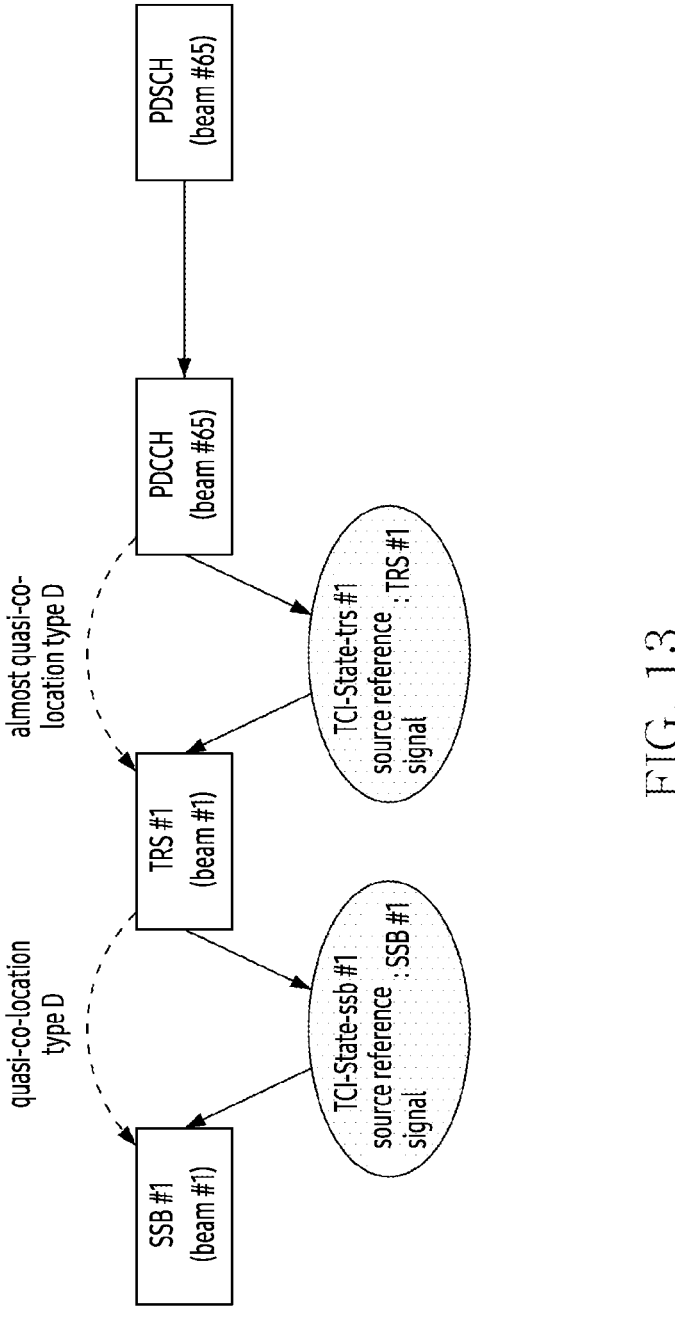
FIG. 13 is a schematic diagram of an example process of a base station indicating transmitting beam information through a TCI-State according to various embodiments.

FIG. 13 is a schematic diagram of an example process of an example base station indicating transmitting beam information through a TCI-State, according to various embodiments. As shown in FIG. 13, for example, when a predicted beam is beam #65 in an enlarged virtual beam set, a mapped indication beam is beam #1 That is, the base station needs to notify relevant information of regular beam #1 corresponding to virtual beam #65 to the UE. The process of beam indication may include, for example, when the base station transmits a PDCCH, the base station may indicate that a TCI-State used for the transmission of the PDCCH is a TRS-based TCI-State with an ID of TCI-State-trs #1, that a source reference signal configured in the TCI-State is TRS #1, and that a quasi-co-location type is D type. After the UE receives the TCI-State, it may consider that the PDCCH and TRS #1 have similar spatial reception parameters. That is, the same receiving beam may be used to receive the PDCCH and TRS #1. At the same time, if the configuration message of TRS #1 contains a SSB-based TCI-State with an ID of TCI-State-ssb #1, and the source reference signal configured in the TCI-State is SSB #1, and the quasi-co-location type is D type, the UE may consider after receiving the TCI-State, that TRS #1 and SSB #1 have similar spatial reception parameters. That is, the same receiving beam may be used to receive TRS #1 and SSB #1. Through links of the above two TCI-States, the UE may use the same receiving beam to receive the PDCCH and SSB #1. At the same time, when the base station transmits a PDSCH, the base station may indicate that the TCI-State used for PDSCH transmission is the same as the TCI-State used by the PDCCH. Therefore, the UE may further use the same receiving beam to receive the PDCCH, PDSCH and SSB #1. In fact, SSB #1 and TRS #1 are sent through regular beam #1, and the PDCCH and the PDSCH are sent through virtual beam #65, but since virtual beam #65 and the mapped regular beam #1 have similar spatial directions, the UE may use the same receiving beam to receive signals from virtual beam #65 and regular beam #1. Because the transmitting beams of the PDCCH and TRS #1 are not exactly the same and are transmitted by the virtual beam and the mapped regular beam respectively, the PDCCH and TRS #1 are not completely quasi-co-located and may, for example, be referred to as almost quasi-co-located.

The base station uses the virtual beam to send data to the UE, but the beam notified to the UE is the mapped regular beam. Thus the UE still uses the regular beam as the transmitting beam to determine the corresponding receiving beam to receive data from the transmitting beam. An advantage of this method is that it is consistent with the original beam indication process, no additional reference signal needs to be configured to indicate the information of the transmitting beam, and the processing complexity of the UE is not be increased.

As described above, in step S430, if the transmitting beam is the second beam, the first beam corresponding to the transmitting beam is determined, and the beam information of the determined first beam is transmitted to the UE. According to an embodiment, the method shown in FIG. 4 may further include, if the transmitting beam is the first beam, transmitting the information of the transmitting beam to the UE.

Finally, in step S440, data is transmitted to the UE using the determined transmitting beam.

According to an embodiment, the base station transmits a PDCCH and/or a PDSCH to the UE using the first beam or the second beam determined from the beambook set. That is, the beamforming is performed on the PDCCH and/or the PDSCH using a beam weight corresponding to the determined transmitting beam, and sent to the UE.

Figure 14:
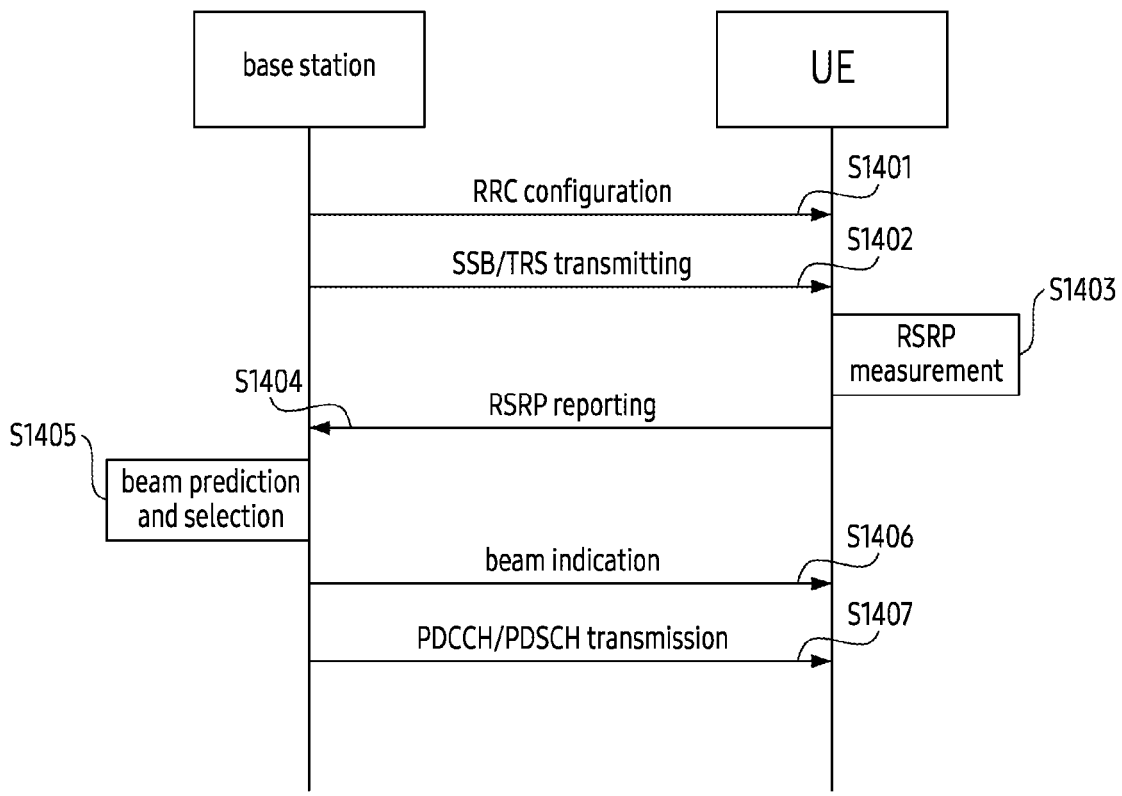
FIG. 14 is a schematic diagram of an example overall beam management flow when it is determined to use a certain beambook set according to various embodiments.

FIG. 14 is a schematic flow diagram of an overall example beam management flow when it is determined to use a certain beambook set, for example, when the base station uses a beambook set corresponding to the second enlarged virtual beambook type.

In the first step, the base station performs RRC configuration for the UE (S1401) and sends corresponding SSB/ TRS reference signals (S1402). The base station configures corresponding SSB reference signals for 64 regular beams in a one-to-one correspondence, and pre-configures 64 SSB-based TCI-States, wherein each TCI-State corresponds to a corresponding SSB reference signal respectively. That is, a source reference signal ID in a TCI-State IE is set to a corresponding SSB sequence number. At the same time, the base station may also configure corresponding TRSs for the 64 regular beams in a one-to-one correspondence, and pre-configure 64 TRS-based TCI-States, wherein each TCI-State corresponds to a corresponding TRS respectively. That is, the source reference signal ID in the TCI-State IE is set to a corresponding TRS sequence number. After configuring SSB and TRS resources, the base station may periodically use different beams to send corresponding SSB and TRS reference signals. For example, the base station may transmit SSB #0 and TRS #0 with beam #0, transmit SSB #1 and TRS #1 with beam #1, . . . , and transmit SSB #63 and TRS #63 with beam #63.

In the second step, the UE performs RSRP measurement and reporting (S1403 and S1404). For example, after receiving the RRC configuration message in the first step, the UE may perform RSRP measurement on each configured SSB resource (for example, perform RSRP measurement on N=64 SSB resources) to obtain a RSRP value of a corresponding beam, and report the highest 4 RSRP values obtained by the measurement and the corresponding SSB sequence numbers to the base station.

In the third step, the base station performs beam prediction and selection (S1405). For example, the base station converts the 4 RSRP values reported by the UE and the corresponding SSB sequence numbers into RSRP values corresponding to four beams, and then combines currently obtained RSRP values of the four beams reported by the UE and T−1 (for example, T=8) times of historically obtained RSRP values of the four beams reported by the UE, after a certain data preprocessing, into a two-dimensional data table with 8 rows*64 columns, and input it into a preset prediction model. An optimal transmitting beam is predicted from all 128 beams (including 64 regular beams and 64 virtual beams).

In the fourth step, the base station performs beam indication and data transmission (S1406 and S1407). The base station uses the optimal transmitting beam predicted in the previous step to perform data transmission of a PDCCH and a PDSCH. When transmitting data of the PDCCH and the PDSCH, corresponding beam information needs to be indicated to the UE. If the predicted optimal transmitting beam is a virtual beam (for example, beam #65), the base station needs to indicate to the UE a regular beam (for example, beam #1) mapped by the virtual beam. If the predicted optimal transmitting beam is a regular beam (for example, beam #1), the base station directly indicates the regular beam to the UE.

Example wireless communication methods of a base station according to various embodiments have been described above with reference to FIGS. 4 to 14. According to the wireless communication methods, the signal quality of the UE may be improved and the power consumption of communication may be reduced. For example, when cell load is heavy and there are many cell-edge UEs, a beambook set corresponding to the enlarged virtual beambook type may be adopted to increase the number of available beams without increasing measurement resource overhead, so that the base station can select a more suitable beam for the UE, thereby improving the signal quality of the UE, especially for cell-edge UEs, and the throughput thereof can be effectively improved. When the cell load is light, a beambook set corresponding to the RS reduced virtual beambook type may be adopted to reduce overhead of measurement resources, reduce transmission power of the base station, reduce measurement burden of the UE, in a case of keeping the number of available beams unchanged, thereby reducing power consumption of the base station and the UE.

Example wireless communication methods at a user equipment side will be described with reference to FIG. 15. FIG. 15 is a flowchart of a wireless communication method for a user equipment according to various embodiments.

As shown in FIG. 15, in step S1510, a measurement reference signal configured for a first beam in a beambook set is received from a base station, wherein the beambook set includes at least one first beam and at least one second beam. According to an embodiment, the first beam may be, for example, a beam that needs to be configured with the measurement reference signal, and the second beam may be, for example, a beam that does not need to be configured with the measurement reference signal. In step S1520, reference signal measurement is performed on the measurement reference signal, and a reference signal measurement value is reported to the base station, wherein the reference signal measurement value is used by the UE to determine a transmitting beam of the base station. For example, the reference signal measurement value may be an RSRP value, but is not limited thereto. In step S1530, beam information of a first beam corresponding to the transmitting beam is received from the base station, if the transmitting beam is the second beam. Finally, in step S1540, a receiving beam of the UE is determined based on the beam information and data is received from the base station using the determined receiving beam.

In an embodiment, the wireless communication method shown in FIG. 15 may further include receiving the beam information of the transmitting beam from the base station if the transmitting beam is the first beam. For example, as mentioned above, the base station may indicate information about the transmitting beam based on a TCI state. In this case, the UE may know the information about the transmitting beam based on information included in a TCI state information element (IE), and then determine a corresponding receiving beam according to the information of the transmitting beam.

According to the above wireless communication method, the signal quality of the UE may be improved and power consumption of communication may be reduced.

Figure 16:
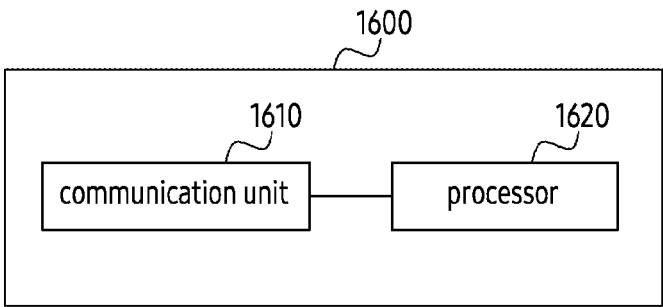
FIG. 16 is a block diagram of an example base station according to various embodiments.

FIG. 16 is a block diagram of an example base station according to various embodiments.

Referring to FIG. 16, a base station 1600 may include a communication unit 1610 (including, e.g., communication circuitry) and at least one processor 1620 (including, e.g., processing circuitry). For example, the communication unit 1610 may include a transceiver. The at least one processor 1620 may be connected with the communication unit 1600 and be configured to, for example, control the communication unit to transmit a measurement reference signal configured for a first beam in a beambook set to a user equipment (UE), wherein the beambook set includes at least one first beam and at least one second beam; determine a transmitting beam from the beambook set based on a reference signal measurement value reported by the UE; determine a first beam corresponding to the transmitting beam if the transmitting beam is the second beam, and control the communication unit to transmit beam information of the determined first beam to the UE; and control the communication unit to transmit data to the UE by using the determined transmitting beam. For details of the above operations, reference may be made to the above description of the wireless communication method performed by the base station, which will not be repeated here.

Figure 17:
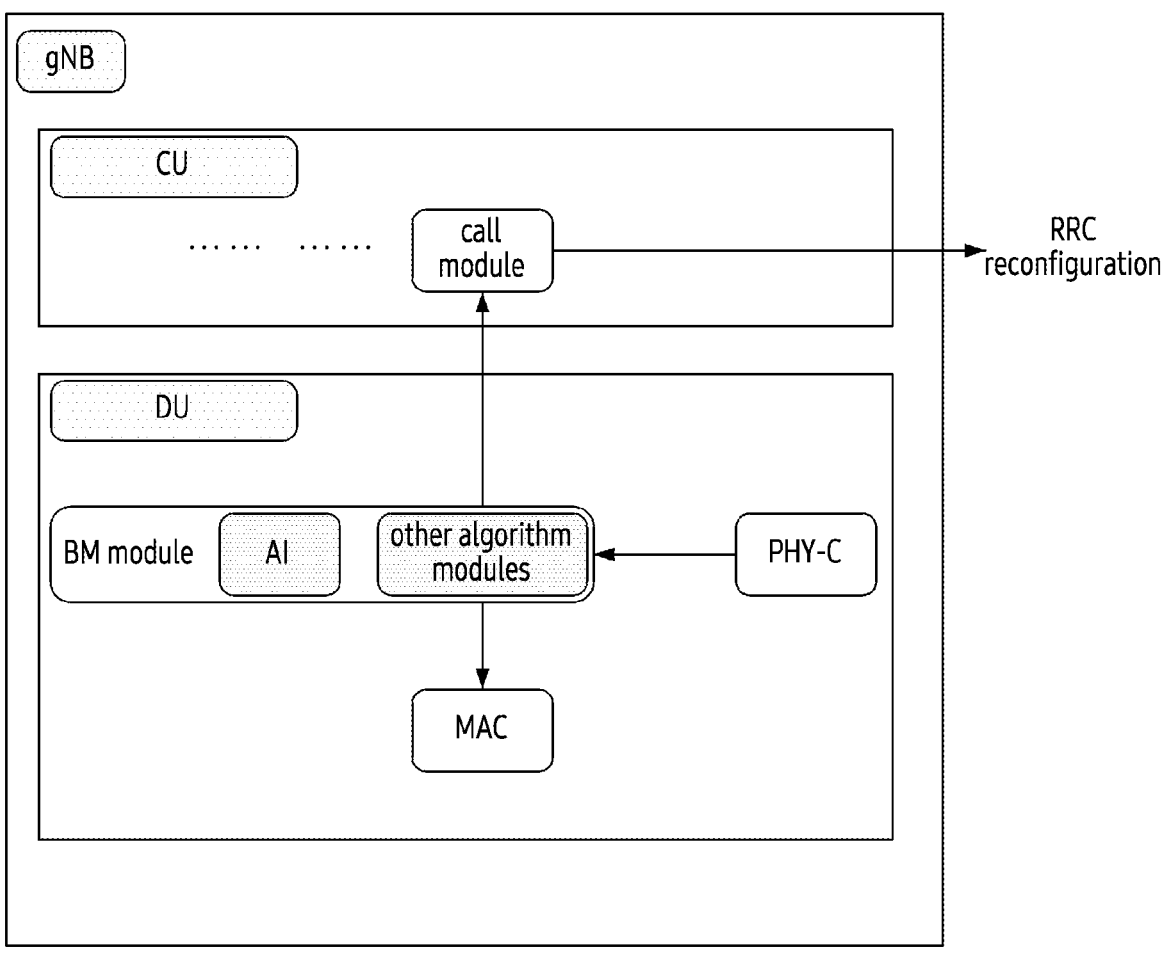
FIG. 17 shows an example configuration of a base station according to various embodiments.

FIG. 17 shows an example configuration of an example base station according to various embodiments.

As shown in FIG. 17, the base station according to the embodiment of the present disclosure may be a 5G base station gNB. The gNB may include a central unit (CU) and a distributed unit (DU). A base station management (BM) module may be set in the DU, and the BM module may perform call processing, signaling processing, radio resource management, radio link management and circuit maintenance functions. In addition, a medium access control (MAC) module and a physical layer controller (PHY-C) may also be included in the DU. According to an embodiment, the BM module may include an AI module and other algorithm execution modules. For example, the PHY-C may judge cell coverage and/or UE distribution in a cell, and select one beambook set from multiple pre-designed beambook sets based on cell load and/or the UE distribution in the cell. If the cell load and/or the UE distribution in the cell requires switching beambook types, the DU may notify a call module in the CU to perform RRC reconfiguration to update previously configured SSB/TRS. After receiving the reconfiguration notification, the calling module may trigger a RRC reconfiguration process to update the previously configured SSB/TRS. In addition, the PHY-C may send RSRP values reported by the UE to the BM module. The RSRP values reported by the UE may be preprocessed by the other algorithm modules, and converted into an input data format of a prediction model, and then the BM module may use the RSRP values reported by the UE to predict an optimal transmitting beam through the AI module included therein. The MAC module may indicate information about the predicted transmitting beam to the UE.

It should be noted that FIG. 17 only shows an example configuration of the base station, and the configuration of the base station according to the embodiment of the present disclosure is not limited to the example shown in FIG. 17.

Figure 18:
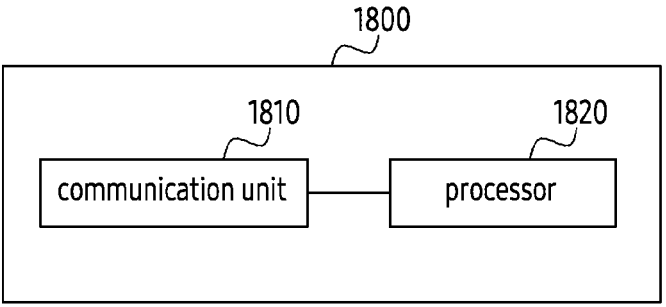
FIG. 18 is a block diagram of an example user equipment according to various embodiments.

FIG. 18 is a block diagram of an example user equipment according to various embodiments.

Referring to FIG. 18, a user equipment 1800 may include a communication unit 1810 (including, e.g., communication circuitry) and at least one processor 1820 (including, e.g., processing circuitry). For example, the communication unit 1810 may include a transceiver. The at least one processor 1820 may be connected to the communication unit 1810 and configured to, for example, control the communication unit to receive, from a base station, a measurement reference signal configured for a first beam in a beambook set, wherein the beambook set includes at least one first beam and at least one second beam; perform reference signal measurement on the measurement reference signal, and control the communication unit to report a reference signal measurement value to the base station, wherein the reference signal measurement value is used by the UE to determine a transmitting beam; control the communication unit to receive beam information of a first beam corresponding to the transmitting beam from the base station, if the transmitting beam is the second beam; and determine a receiving beam based on the beam information, and control the communication unit to receive data from the base station using the determined receiving beam. For details of the above operations, reference may be made to the above description of the wireless communication method performed by the user equipment, which will not be repeated here.

Figure 19:
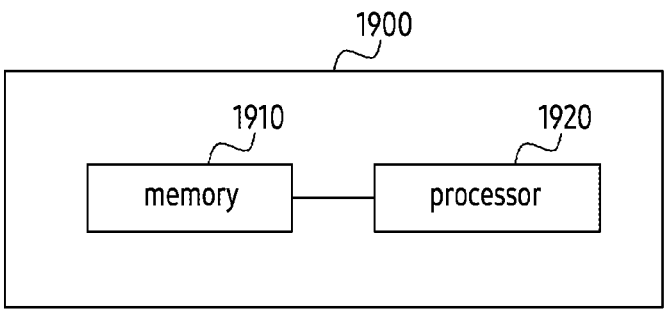
FIG. 19 is a block diagram of an example electronic device according to various embodiments.

FIG. 19 is a block diagram of an example electronic device according to various embodiments.

Referring to FIG. 19, an electronic device 1900 may include at least one memory 1910 and at least one processor 1920 (including, e.g., processing circuitry), the at least one memory 1910 storing computer-executable instructions that, when executed by the at least one processor 1920, cause the at least one processor 1920 to perform the wireless communication method according to an embodiment of the present disclosure.

The above example electronic device may be a network-side device or a user-side device.

According to embodiments, a wireless communication method for a base station comprises transmitting a measurement reference signal configured for a first beam in a beambook set to a user equipment (UE), wherein the beambook set includes at least one first beam and at least one second beam. The method comprises determining a transmitting beam from the beambook set based on a reference signal measurement value reported by the UE. The method comprises determining a first beam corresponding to the transmitting beam if the transmitting beam is the second beam. The method comprises transmitting beam information of the determined first beam to the UE. The method comprises transmitting data to the UE using the determined transmitting beam.

In an embodiment, the first beam is a beam that needs to be configured with the measurement reference signal. The second beam is a beam that does not need to be configured with the measurement reference signal.

In an embodiment, the method further comprises selecting the beambook set from a plurality of beambook sets, wherein the plurality of beambook sets include at least two of a first beambook set of a first beambook type, a second beambook set of a second beambook type, or a third beambook set of a third beambook type. All beams in the first beambook set are first beams. The number of beams in the second beambook set is greater than the number of beams in the first beambook set, and some of the beams in the second beambook set are first beams, and some other ones of the beams are second beams. The number of beams in the third beambook set is equal to or smaller than the number of the beams in the first beambook set, and some of the beams in the third beambook set are first beams and some other ones of the beams are second beams.

In an embodiment, the selecting of the beambook set from the plurality of beambook sets includes selecting the beambook set from the plurality of beambook sets based on at least one of cell load of a cell where the base station is located, a distribution of UEs in the cell, or a maximum transmitting power of the base station.

In an embodiment, the selecting of the beambook set from the plurality of beambook sets comprises selecting the second beambook set from the plurality of beambook sets as the beambook set if a first condition is satisfied, wherein the first condition is that the cell load is greater than a first threshold and the number of UEs located at the edge of the cell is greater than a second threshold. The selecting of the beambook set from the plurality of beambook sets comprises selecting the third beambook set from the plurality of beambook sets as the beambook set if a second condition is satisfied, wherein the second condition is that the cell load is less than a third threshold.

In an embodiment, the selecting of the beambook set from the plurality of beambook sets includes at least one of selecting the second beambook set from the plurality of beambook sets as the beambook set if the maximum transmitting power of the base station is not less than a first preset threshold and selecting the third beambook set from the plurality of beambook sets as the beambook set if the maximum transmitting power of the base station is not greater than a second preset threshold.

In an embodiment, the method further comprises configuring the measurement reference signal for each first beam in the beambook set. The measurement reference signal includes a synchronization signal block (SSB) reference signal.

In an embodiment, the determining of the transmitting beam from the beambook set based on the reference signal measurement value reported by the UE comprises determining the transmitting beam from the beambook set using a prediction model, based on the reference signal measurement value reported by the UE and a historical reference signal measurement value historically reported by the UE.

In an embodiment, the method further comprises transmitting the beam information of the transmitting beam to the UE if the transmitting beam is the first beam.

In an embodiment, the determining of the first beam corresponding to the transmitting beam comprises determining the first beam corresponding to the transmitting beam based on a mapping relationship between the first beam and the second beam.

In an embodiment, the mapping relationship between the first beam and the second beam may be established according to spatial correlation between the second beam and the first beam.

In an embodiment, the determined first beam and the transmitting beam may have similar spatial beam directions.

In an embodiment, the transmitting of the beam information of the determined first beam to the UE comprises transmitting the beam information of the determined first beam to the UE based on a transmission configuration indication (TCI) state corresponding to the measurement reference signal.

According to embodiments, a wireless communication method for a user equipment comprises receiving, from a base station, a measurement reference signal configured for a first beam in a beambook set, wherein the beambook set includes at least one first beam and at least one second beam. The method comprises performing reference signal measurement on the measurement reference signal. The method comprises reporting a reference signal measurement value to the base station. The reference signal measurement value is used by the UE to determine a transmitting beam of the base station. The method comprises receiving beam information of a first beam corresponding to the transmitting beam from the base station if the transmitting beam is the second beam. The method comprises determining a receiving beam of the UE based on the beam information, and receiving data from the base station using the determined receiving beam.

In an embodiment, the method further comprises receiving the beam information of the transmitting beam from the base station if the transmitting beam is the first beam.

In an embodiment, the first beam may be a beam that needs to be configured with the measurement reference signal, and the second beam may be a beam that does not need to be configured with the measurement reference signal.

According to embodiments, a base station comprises a communication unit. The base station comprises at least one processor connected to the communication unit. The at least one processor is configured to control the communication unit to transmit a measurement reference signal configured for a first beam in a beambook set to a user equipment (UE). The beambook set includes at least one first beam and at least one second beam. The at least one processor is configured to determine a transmitting beam from the beambook set based on a reference signal measurement value reported by the UE. The at least one processor is configured to determine a first beam corresponding to the transmitting beam if the transmitting beam is the second beam. The at least one processor is configured to control the communication unit to transmit beam information of the determined first beam to the UE. The at least one processor is configured to control the communication unit to transmit data to the UE using the determined transmitting beam.

According to embodiments, a user equipment (UE) comprises a communication unit including communication circuitry. The UE comprise at least one processor connected to the communication unit. The at least one processor is configured to control the communication unit to receive, from a base station, a measurement reference signal configured for a first beam in a beambook set, wherein the beambook set comprises at least one first beam and at least one second beam. The at least one processor is configured to perform reference signal measurement on the measurement reference signal, and control the communication unit to report a reference signal measurement value to the base station, wherein the reference signal measurement value is for the UE to determine a transmitting beam of the base station. The at least one processor is configured to control the communication unit to receive beam information of a first beam corresponding to the transmitting beam from the base station, if the transmitting beam is the second beam. The at least one processor is configured to determine a receiving beam of the UE based on the beam information, and control the communication unit to receive data from the base station using the determined receiving beam.

According to embodiments, an electronic device may include at least one processor; and at least one memory storing computer executable instructions, wherein the computer executable instructions, when executed by the at least one processor, cause the at least one processor to perform the above wireless communication methods.

According to embodiments, a non-transitory computer readable storage medium storing instructions is provided, the instructions, when executed by at least one processor, cause the at least one processor to perform the above wireless communication methods.

According to embodiments, a method performed by a base station, comprises transmitting a reference signal associated with a first beam in a beambook to a user equipment (UE), wherein the beambook comprises a first beam set including the first beam and a second beam set. The method comprises determining a transmitting beam of the first beam set and the second beam set based on measurement information including received power value of the reference signal received from the UE. The method comprises determining index of the first beam corresponding to the transmitting beam in case that the transmitting beam is a second beam included in the second beam set. The method comprises transmitting beam information including the index to the UE. The first beam is configured to measure the received power value. A signal transmitted using the first beam and a signal transmitted using the second beam are received using a receiving beam of the UE.

In an embodiment, the method comprises receiving the measurement information from the UE. The method comprises transmitting data using the transmitting beam to the UE.

In an embodiment, the method comprises identifying the beambook from a plurality of beambooks, wherein the plurality of beambooks comprise at least two of a first beambook of a first beambook type, a second beambook of a second beambook type, or a third beambook of a third beambook type. All beams in the first beambook are the first beam set. A number of beams in the second beambook is greater than a number of beams in the first beambook, and some of the beams in the second beambook include the first beam set, and some other ones of the beams include the second beam set. A number of beams in the third beambook is equal to or smaller than the number of the beams in the first beambook, and some of the beams in the third beambook include the first beam set and some other ones of the beams include the second beam set.

In an embodiment, the identifying of the beambook from the plurality of beambooks comprises identifying the beambook from the plurality of beambooks based on at least one of cell load of a cell where the base station is located, a distribution of UEs in the cell, or a maximum transmitting power of the base station.

In an embodiment, the identifying of the beambook from the plurality of beambooks comprises identifying the second beambook from the plurality of beambooks as the beambook if a first condition is satisfied. The first condition comprises that a cell load of a cell where the base station is located is greater than a first threshold and a number of UEs located at an edge of the cell is greater than a second threshold. The identifying of the beambook from the plurality of beambooks comprises identifying the third beambook from the plurality of beambooks as the beambook if a second condition is satisfied, wherein the second condition comprises the cell load being less than a third threshold.

In an embodiment, wherein the identifying of the beambook from the plurality of beambooks comprises at least one of: identifying the second beambook from the plurality of beambooks as the beambook if a maximum transmitting power of the base station is greater than a first threshold or identifying the third beambook from the plurality of beambooks as the beambook if the maximum transmitting power of the base station is less than a second threshold.

In an embodiment, the method comprises configuring the reference signal for each first beam of the first beam set in the beambook. The reference signal comprises a synchronization signal block (SSB) reference signal.

In an embodiment, wherein the determining of the transmitting beam comprises determining the transmitting beam of the first beam set and the second beam set using a prediction model, based on the measurement information and a historical measurement value historically reported from the UE.

In an embodiment, the method comprises transmitting the beam information of the transmitting beam to the UE if the transmitting beam is the first beam.

In an embodiment, wherein the determining of the index comprises determining the index of the first beam corresponding to the transmitting beam based on a mapping relationship between the first beam and the second beam.

In an embodiment, wherein the mapping relationship between the first beam and the second beam is established according to spatial correlation between the second beam and the first beam.

In an embodiment, wherein the second beam is a beam is not configured to measure the received power value.

In an embodiment, wherein the transmitting of the beam information comprises transmitting the beam information of the determined first beam to the UE based on a transmission configuration indication (TCI) state corresponding to the reference signal.

According to embodiments, a base station comprises a transceiver. The base station comprises at least one processor coupled to the transceiver. The at least one processor is configured to transmit a reference signal associated with a first beam in a beambook to a user equipment (UE), wherein the beambook comprises a first beam set including the first beam and a second beam set. The at least one processor is configured to determine a transmitting beam of the first beam set and the second beam set based on measurement information including received power value of the reference signal received from the UE. The at least one processor is configured to determine index of the first beam corresponding to the transmitting beam in case that the transmitting beam is a second beam included in the second beam set. The at least one processor is configured to transmit beam information including the index to the UE. The first beam is configured to measure the received power value. A signal transmitted using the first beam and a signal transmitted using the second beam are received using a receiving beam of the UE.

In an embodiment, wherein the at least one processor is configured to identify the beambook from a plurality of beambooks, wherein the plurality of beambooks comprise at least two of a first beambook of a first beambook type, a second beambook of a second beambook type, or a third beambook of a third beambook type. All beams in the first beambook are the first beam set. A number of beams in the second beambook is greater than a number of beams in the first beambook, and some of the beams in the second beambook include the first beam set, and some other ones of the beams include the second beam set. A number of beams in the third beambook is equal to or smaller than the number of the beams in the first beambook, and some of the beams in the third beambook include the first beam set and some other ones of the beams include the second beam set.

In an embodiment, the at least one processor is further configured to identify the beambook from the plurality of beambooks based on at least one of cell load of a cell where the base station is located, a distribution of UEs in the cell, or a maximum transmitting power of the base station.

In an embodiment, the at least one processor is configured to identify the second beambook from the plurality of beambooks as the beambook if a first condition is satisfied, wherein the first condition comprises that a cell load of a cell where the base station is located is greater than a first threshold and a number of UEs located at an edge of the cell is greater than a second threshold. The at least one processor is configured to identify the third beambook from the plurality of beambooks as the beambook if a second condition is satisfied, wherein the second condition comprises the cell load being less than a third threshold.

In an embodiment, wherein the at least one processor is configured to configure the reference signal for each first beam of the first beam set in the beambook. The reference signal comprises a synchronization signal block (SSB) reference signal.

In an embodiment, wherein the transmitting beam is determined using a prediction model, based on the measurement information and a historical measurement value historically reported from the UE.

According to embodiments, a non-transitory computer-readable storage medium having stored thereon program instructions, the instructions, when executed by a processor, perform operations includes transmitting a reference signal associated with a first beam in a beambook to a user equipment (UE), wherein the beambook comprises a first beam set including the first beam and a second beam set. The instructions, when executed by the processor, perform operations includes determining a transmitting beam of the first beam set and the second beam set based on measurement information including received power value of the reference signal received from the UE. The instructions, when executed by the processor, perform operations includes determining index of the first beam corresponding to the transmitting beam in case that the transmitting beam is a second beam included in the second beam set. The instructions, when executed by the processor, perform operations includes transmitting beam information including the index to the UE. The first beam is configured to measure the received power value. A signal transmitted using the first beam and a signal transmitted using the second beam are received using a receiving beam of the UE.

At least one of the above multiple modules may be implemented by an AI model. Functions associated with AI may be performed by a non-volatile memory, a volatile memory, and a processor.

The processor may include one or more processors. The one or more processors may be, for example, general-purpose processors such as central processing units (CPUs), application processors (APs), etc., processors only used for graphics such as graphics processors (GPUs), vision processors (VPU), and/or AI-specific processors such as neural processing units (NPUs).

One or more processors may control processing of inputting data according to predefined operating rules or artificial intelligence (AI) models stored in the non-volatile memory and the volatile memory. The predefined operating rules or the artificial intelligence models may be provided through training or learning. Here, providing by learning means that by applying a learning algorithm to a plurality of learning data, a predefined operating rule or AI model with desired properties is formed. Learning may be performed in an AI executing device itself according to an embodiment, and/or may be implemented by a separate server/device/system.

A learning algorithm is a method of using a plurality of learning data to train a predetermined target device (e.g., a robot) to cause, allow or control the target device to make a determination or prediction. Examples of the learning algorithm include, but are not limited to, supervised learning, unsupervised learning, semi-supervised learning, or reinforcement learning.

An AI model may be obtained by training. Here, "obtained by training" refers, for example, to training a basic artificial intelligence model with a plurality of training data through a training algorithm, thereby obtaining a predefined operating rule or artificial intelligence model configured to perform required characteristics (or purposes).

As an example, an artificial intelligence model may include a plurality of neural network layers. Each of the plurality of neural network layers may include a plurality of weight values, and neural network calculation is performed by a calculation between calculation results of a previous layer and the plurality of weight values. Examples of neural networks include, but are not limited to, convolutional neural networks (CNN), deep neural networks (DNN), recurrent neural networks (RNN), restricted Boltzmann machines (RBM), deep belief networks (DBN), bidirectional recurrent deep neural networks (BRDNN), generative adversarial networks (GAN), and deep Q-networks.

According to an example embodiment of the present disclosure, a non-transitory computer readable storage medium storing a computer program is also provided. The computer program, when executed by at least one processor, causes the at least one processor to perform a wireless communication method according to the various embodiments of the present disclosure. Examples of computer-readable storage media herein include: Read Only Memory (ROM), Random Access Programmable Read Only Memory (RAPROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blue-ray or optical disk storage, Hard Disk Drive (HDD), Solid State Drive (SSD), card storage (such as multimedia cards, secure digital (SD) cards or extremely fast digital (XD) cards), magnetic tapes, floppy disks, magneto-optical data storage devices, optical data storage devices, hard disks, solid state disks, and any other devices that are configured to store computer programs and any associated data, data files and data structures in a non-transitory manner and provide the computer programs and any associated data, data files and data structures to a processor or computer so that the processor or computer can execute the computer programs. The instructions or computer programs in the computer-readable storage medium described above may be executed in an environment deployed in a computer device. In addition, in an example, the computer programs and any associated data, data files, and data structures are distributed on a networked computer system, so that the computer programs and any associated data, data files, and data structures are stored, accessed and executed through one or more processors or computers in a distributed manner.

Other embodiments of the present disclosure may readily be conceived by those skilled in the art upon consideration of the specification and practice of the systems and methods disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as examples only, with the true scope and spirit of the disclosure being defined by the claims.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a base station, comprising:
transmitting a reference signal associated with a first beam in a beambook to a user equipment (UE), wherein the beambook comprises a first beam set including the first beam and a second beam set, and wherein beams included in the first beam set are in one-to-one correspondence with beams included in the second beam set;
determining a transmitting beam of the first beam set and the second beam set based on measurement information including received power value of the reference signal received from the UE;
based on identifying that the transmitting beam is a second beam included in the second beam set, determining an index of the first beam corresponding to the second beam;
transmitting beam information including the index to the UE; and
based on transmitting the beam information, transmitting data using the transmitting beam which is the second beam included in the second beam set, to the UE,
wherein the first beam is configured to measure the received power value, and
wherein both a signal transmitted using the first beam and a signal transmitted using the second beam are received using a receiving beam of the UE, the receiving beam being associated with the first beam index.

2. The method of claim 1, further comprising:
receiving the measurement information from the UE.

3. The method of claim 1, further comprising:
identifying the beambook from a plurality of beambooks, wherein the plurality of beambooks comprise at least two of a first beambook of a first beambook type, a second beambook of a second beambook type, or a third beambook of a third beambook type,
wherein all beams in the first beambook are the first beam set;
wherein a number of beams in the second beambook is greater than a number of beams in the first beambook, and some of the beams in the second beambook include the first beam set, and some other ones of the beams include the second beam set; and
wherein a number of beams in the third beambook is equal to or smaller than the number of the beams in the first beambook, and some of the beams in the third beambook include the first beam set and some other ones of the beams include the second beam set.

4. The method of claim 3, wherein the identifying of the beambook from the plurality of beambooks comprises:
identifying the beambook from the plurality of beambooks based on at least one of cell load of a cell where the base station is located, a distribution of UEs in the cell, or a maximum transmitting power of the base station.

5. The method of claim 3, wherein the identifying of the beambook from the plurality of beambooks comprises:

identifying the second beambook from the plurality of beambooks as the beambook if a first condition is satisfied, wherein the first condition comprises that a cell load of a cell where the base station is located is greater than a first threshold and a number of UEs located at an edge of the cell is greater than a second threshold; and identifying the third beambook from the plurality of beambooks as the beambook if a second condition is satisfied, wherein the second condition comprises the cell load being less than a third threshold.

6. The method of claim 3, wherein the identifying of the beambook from the plurality of beambooks comprises at least one of:

identifying the second beambook from the plurality of beambooks as the beambook if a maximum transmitting power of the base station is greater than a first threshold; or identifying the third beambook from the plurality of beambooks as the beambook if the maximum transmitting power of the base station is less than a second threshold.

7. The method of claim 1, further comprising:

configuring the reference signal for each first beam of the first beam set in the beambook, wherein the reference signal comprises a synchronization signal block (SSB) reference signal.

8. The method of claim 1, wherein the determining of the transmitting beam comprises:

determining the transmitting beam of the first beam set and the second beam set using a prediction model, based on the measurement information and a historical measurement value historically reported from the UE.

9. The method of claim 1, further comprising:

transmitting the beam information of the transmitting beam to the UE if the transmitting beam is the first beam.

10. The method of claim 1, wherein the determining of the index comprises:

determining the index of the first beam corresponding to the transmitting beam based on a mapping relationship between the first beam and the second beam.

11. The method of claim 10, wherein the mapping relationship between the first beam and the second beam is established according to spatial correlation between the second beam and the first beam.

12. The method of claim 1, wherein the second beam is a beam is not configured to measure the received power value.

13. The method of claim 1, wherein the transmitting of the beam information comprises:

transmitting the beam information of the first beam to the UE based on a transmission configuration indication (TCI) state corresponding to the reference signal.

14. A base station comprising:

a transceiver; and at least one processor, comprising processing circuitry, coupled to the transceiver, wherein the at least one processor is configured to:

transmit a reference signal associated with a first beam in a beambook to a user equipment (UE), wherein the beambook comprises a first beam set including the first beam and a second beam set, and wherein beams included in the first beam set are in one-to-one correspondence with beams included in the second beam set;

determine a transmitting beam of the first beam set and the second beam set based on measurement information including received power value of the reference signal received from the UE;

based on identifying that the transmitting beam is a second beam included in the second beam set, determine an index of the first beam corresponding to the second beam;

transmit beam information including the index to the UE; and based on transmitting the beam information, transmitting data using the transmitting beam which is the second beam included in the second beam set, to the UE, wherein the first beam is configured to measure the received power value, and wherein both a signal transmitted using the first beam and a signal transmitted using the second beam are received using a receiving beam of the UE, the receiving beam being associated with the first beam index.

15. The base station of claim 14, wherein the at least one processor is configured to:

identify the beambook from a plurality of beambooks, wherein the plurality of beambooks comprise at least two of a first beambook of a first beambook type, a second beambook of a second beambook type, or a third beambook of a third beambook type, wherein all beams in the first beambook are the first beam set;

wherein a number of beams in the second beambook is greater than a number of beams in the first beambook, and some of the beams in the second beambook include the first beam set, and some other ones of the beams include the second beam set; and wherein a number of beams in the third beambook is equal to or smaller than the number of the beams in the first beambook, and some of the beams in the third beambook include the first beam set and some other ones of the beams include the second beam set.

16. The base station of claim 15, wherein the at least one processor is configured to identify the beambook from the plurality of beambooks based on at least one of cell load of a cell where the base station is located, a distribution of UEs in the cell, or a maximum transmitting power of the base station.

17. The base station of claim 15, wherein the at least one processor is configured to:

identify the second beambook from the plurality of beambooks as the beambook if a first condition is satisfied, wherein the first condition comprises that a cell load of a cell where the base station is located is greater than a first threshold and a number of UEs located at an edge of the cell is greater than a second threshold; and identify the third beambook from the plurality of beambooks as the beambook if a second condition is satisfied, wherein the second condition comprises the cell load being less than a third threshold.

18. The base station of claim 14, wherein the at least one processor is configured to:

configure the reference signal for each first beam of the first beam set in the beambook, wherein the reference signal comprises a synchronization signal block (SSB) reference signal.

19. The base station of claim 14, wherein the transmitting beam is determined using a prediction model, based on the measurement information and a historical measurement value historically reported from the UE.

20. A non-transitory computer-readable storage medium having stored thereon program instructions, the instructions, when executed by a processor, perform operations including:

transmitting a reference signal associated with a first beam in a beambook to a user equipment (UE), wherein the beambook comprises a first beam set including the first beam and a second beam set, and wherein beams included in the first beam set are in one-to-one correspondence with beams included in the second beam set;

determining a transmitting beam of the first beam set and the second beam set based on measurement information including received power value of the reference signal received from the UE;

based on identifying that the transmitting beam is a second beam included in the second beam set, determining an index of the first beam corresponding to the transmitting beam;

transmitting beam information including the index to the UE; and based on transmitting the beam information, transmitting data using the transmitting beam which is the second beam included in the second beam set, to the UE, wherein the first beam is configured to measure the received power value, and wherein both a signal transmitted using the first beam and a signal transmitted using the second beam are received using a receiving beam of the UE, the receiving beam being associated with the first beam index.

\*　\*　\*　\*　\*